US012566101B2

(12) United States Patent
Xu et al.

(10) Patent No.: US 12,566,101 B2
(45) Date of Patent: Mar. 3, 2026

(54) VIBRATION EVALUATION METHOD AND APPARATUS, COMPUTER DEVICE, STORAGE MEDIUM, AND COMPUTER PROGRAM PRODUCT

(71) Applicant: Tencent Technology (Shenzhen) Company Limited, Shenzhen (CN)

(72) Inventors: Shili Xu, Shenzhen (CN); Lina Gao, Shenzhen (CN); Qitian Zhang, Shenzhen (CN); Yajun Zhang, Shenzhen (CN); Hao Wang, Shenzhen (CN); Kai Hong, Shenzhen (CN); Zhuan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 378 days.

(21) Appl. No.: 18/239,081

(22) Filed: Aug. 28, 2023

(65) Prior Publication Data

US 2023/0400378 A1      Dec. 14, 2023

Related U.S. Application Data

(63) Continuation of application No. PCT/CN2022/096867, filed on Jun. 2, 2022.

(30) Foreign Application Priority Data

Jul. 1, 2021    (CN) .......................... 202110751208.7

(51) Int. Cl.
G01M 7/02          (2006.01)
G05B 19/4155     (2006.01)

(52) U.S. Cl.
CPC ......... G01M 7/025 (2013.01); G05B 19/4155 (2013.01); G05B 2219/37032 (2013.01)

(58) Field of Classification Search
CPC .......................... G01M 7/025; G05B 19/4155
See application file for complete search history.

(56) References Cited

U.S. PATENT DOCUMENTS

2014/0375602 A1    12/2014  Fujiune
2018/0364132 A1    12/2018  Knaup
(Continued)

FOREIGN PATENT DOCUMENTS

CN        104010263  A      8/2014
CN        104154852  A     11/2014
(Continued)

OTHER PUBLICATIONS

Tencent Technology, WO, PCT/CN2022/096867, Aug. 26, 2022, 3 pgs.
(Continued)

*Primary Examiner* — Mark A Connolly
(74) *Attorney, Agent, or Firm* — Morgan, Lewis & Bockius LLP

(57)        ABSTRACT

Embodiments of this application provide a vibration evaluation method performed by a computer device. The method includes: generating an actual vibration attribute curve of a target object including reference vibration attribute values at a plurality of timestamps; determining at least one delay duration of N actual transformation points according to a time difference between a reference vibration attribute curve of the reference vibration attribute information and the actual vibration attribute curve; correcting the actual vibration attribute curve by using the delay duration to obtain a corrected vibration attribute curve; and acquiring target curve deviation information between the reference vibration attribute curve and the corrected vibration attribute curve, and adjusting a vibration effect of the target object based on the target curve deviation information. Through this appli- (Continued)

cation, the accuracy of an evaluation result of the vibration effect of the target object can be improved.

20 Claims, 10 Drawing Sheets

(56)                References Cited

U.S. PATENT DOCUMENTS

| | | | | |
|---|---|---|---|---|
| 2020/0182747 | A1* | 6/2020 | Finnegan | G01M 7/025 |
| 2023/0100001 | A1* | 3/2023 | Lammersen | G16C 20/70 |
| | | | | 700/270 |

FOREIGN PATENT DOCUMENTS

| | | | |
|---|---|---|---|
| CN | 108496123 | A | 9/2018 |
| CN | 109163794 | A | 1/2019 |
| CN | 109951602 | A | 6/2019 |
| CN | 110068435 | A | 7/2019 |
| CN | 110631690 | A | 12/2019 |
| CN | 111223206 | A | 6/2020 |
| CN | 212008860 | U | 11/2020 |
| CN | 112529452 | A | 3/2021 |
| JP | 2019219323 | A | 12/2019 |
| WO | WO 2013021998 | A1 | 2/2013 |
| WO | WO 2020132836 | A1 | 7/2020 |

OTHER PUBLICATIONS

Tencent Technology, IPRP, PCT/CN2022/096867, Dec. 14, 2023, 4 pgs.
Tencent Technology, Extended European Search Report, EP Patent Application No. 22831613.9, Jan. 29. 2025, 14 pgs.
Tencent Technology, ISR, PCT/CN2022/096867, Aug. 26, 2022, 2 pgs.

* cited by examiner

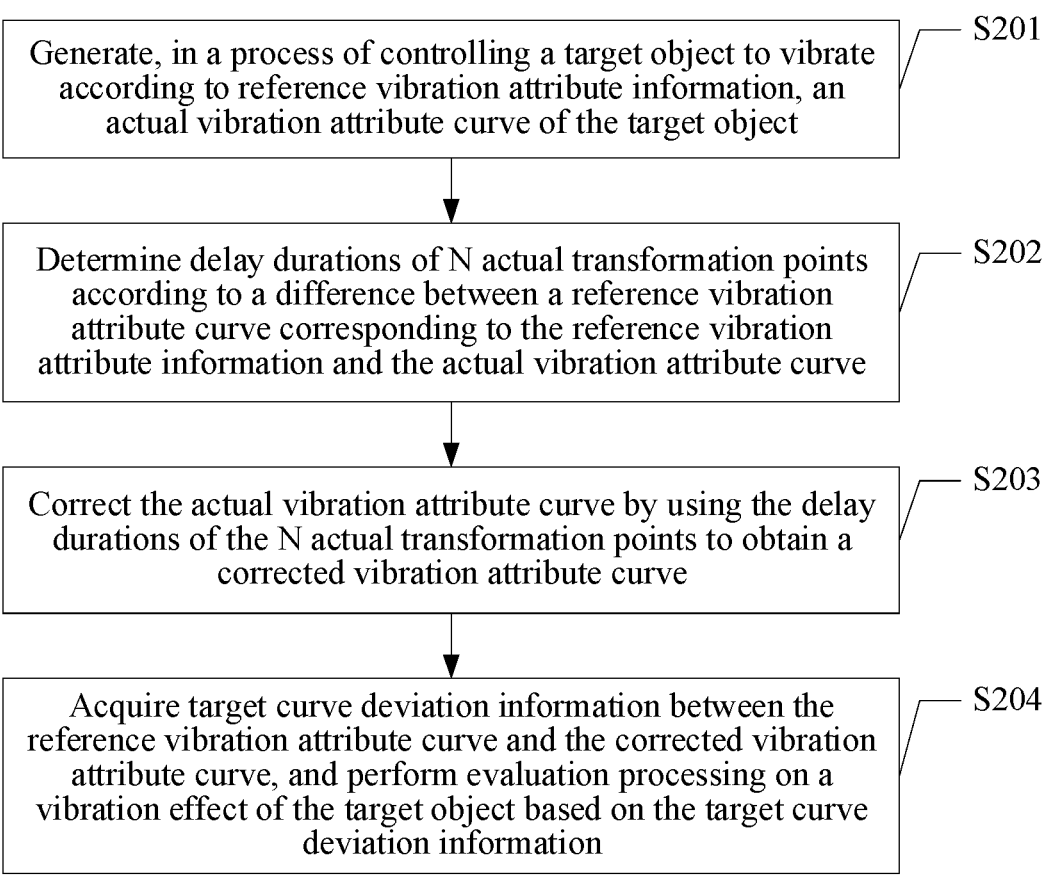

Generate, in a process of controlling a target object to vibrate according to reference vibration attribute information, an actual vibration attribute curve of the target object — S201

Determine delay durations of N actual transformation points according to a difference between a reference vibration attribute curve corresponding to the reference vibration attribute information and the actual vibration attribute curve — S202

Correct the actual vibration attribute curve by using the delay durations of the N actual transformation points to obtain a corrected vibration attribute curve — S203

Acquire target curve deviation information between the reference vibration attribute curve and the corrected vibration attribute curve, and perform evaluation processing on a vibration effect of the target object based on the target curve deviation information — S204

FIG. 2

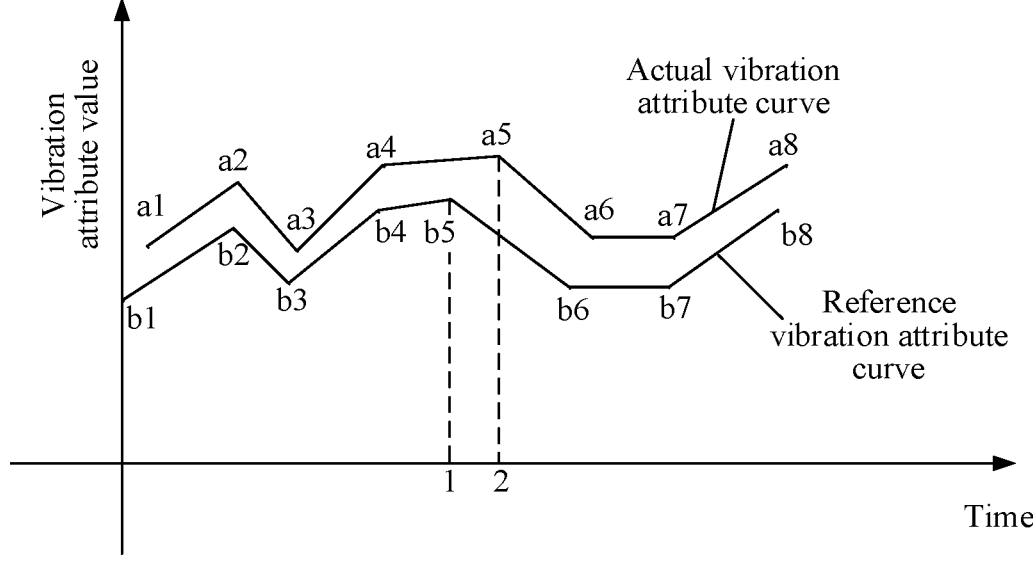

FIG. 3A

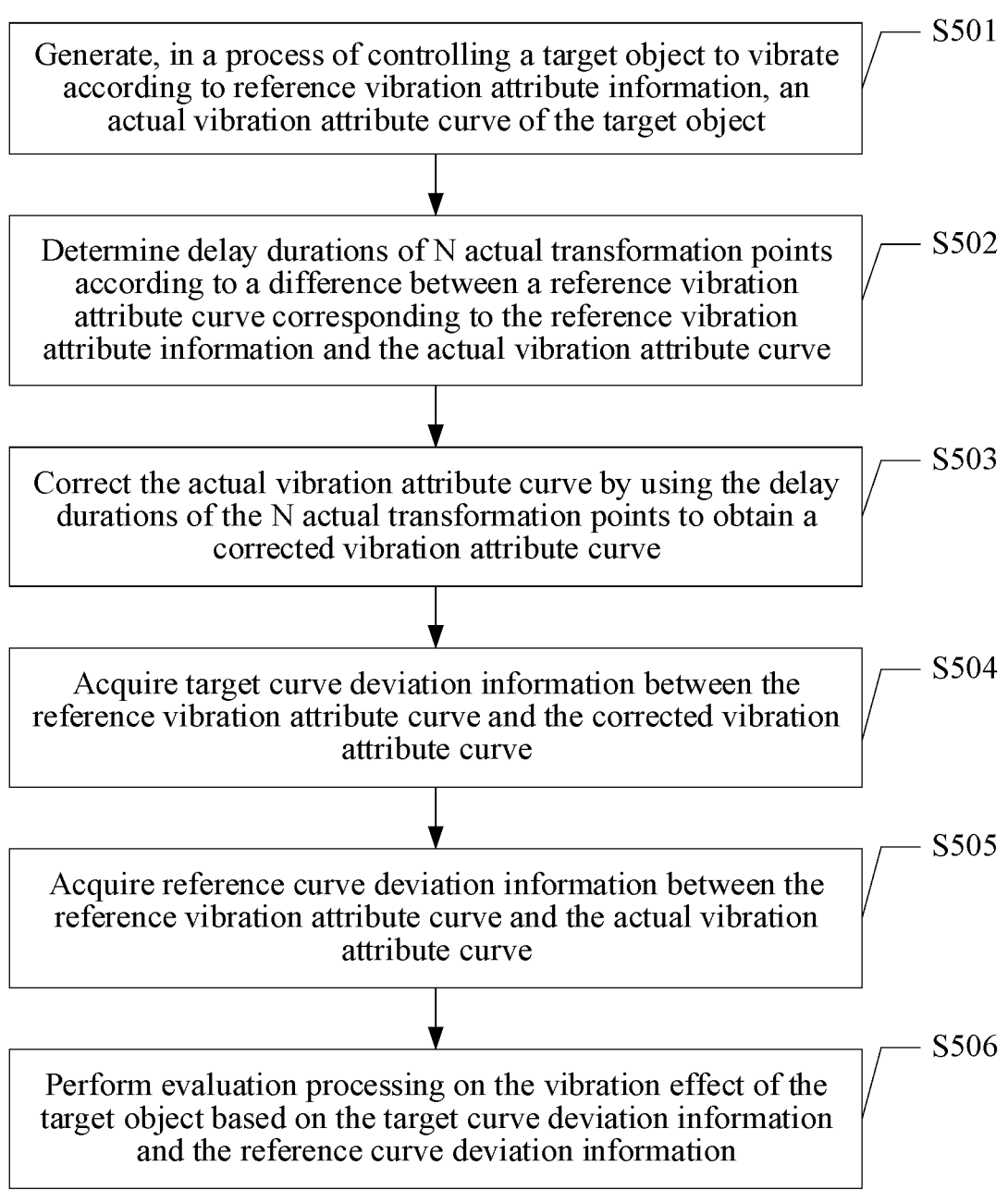

Generate, in a process of controlling a target object to vibrate according to reference vibration attribute information, an actual vibration attribute curve of the target object — S501

Determine delay durations of N actual transformation points according to a difference between a reference vibration attribute curve corresponding to the reference vibration attribute information and the actual vibration attribute curve — S502

Correct the actual vibration attribute curve by using the delay durations of the N actual transformation points to obtain a corrected vibration attribute curve — S503

Acquire target curve deviation information between the reference vibration attribute curve and the corrected vibration attribute curve — S504

Acquire reference curve deviation information between the reference vibration attribute curve and the actual vibration attribute curve — S505

Perform evaluation processing on the vibration effect of the target object based on the target curve deviation information and the reference curve deviation information — S506

FIG. 5

VIBRATION EVALUATION METHOD AND APPARATUS, COMPUTER DEVICE, STORAGE MEDIUM, AND COMPUTER PROGRAM PRODUCT

CROSS-REFERENCE TO RELATED APPLICATIONS

This application is a continuation application of PCT Patent Application No. PCT/CN2022/096867, entitled "VIBRATION EVALUATION METHOD AND APPARATUS, COMPUTER DEVICE, STORAGE MEDIUM, AND COMPUTER PROGRAM PRODUCT" filed on Jun. 2, 2022, which claims priority to Chinese Patent Application No. 202110751208.7, entitled "VIBRATION EVALUATION METHOD AND APPARATUS, COMPUTER DEVICE, STORAGE MEDIUM, AND COMPUTER PROGRAM PRODUCT" filed on Jul. 1, 2021, all of which is incorporated by reference in its entirety.

FIELD OF THE TECHNOLOGY

This application relates to the field of Internet technologies, and relates, but is not limited to, a vibration evaluation method and apparatus, a computer device, a storage medium, and a computer program product.

BACKGROUND OF THE DISCLOSURE

When daily users use devices, there is usually a "tactile" experience. For example, when users use devices, such as mobile phones, earphones, and massage chairs, they may trigger these devices to generate some vibration sensations through a certain operation. The vibration sensations generated by these devices are generally generated through vibrations of vibration components in the devices. The quality of the vibration sensations corresponding to the devices is generally determined according to vibration conditions of the vibration components of the devices. However, there is a lack of solutions for accurately evaluating a vibration effect in a related art.

SUMMARY

Embodiments of this application provide a vibration evaluation method and apparatus, a computer device, a storage medium, and a computer program product, which can improve the accuracy of an evaluation result of a vibration effect of a target object.

An embodiment of this application provides a vibration evaluation method. The method includes: generating, in a process of controlling a target object to vibrate according to a reference vibration attribute curve, an actual vibration attribute curve of the target object, the reference vibration attribute curve including reference vibration attribute values at a plurality of timestamps; determining at least one delay duration of N actual transformation points according to a time difference between the reference vibration attribute curve and the actual vibration attribute curve, N being a positive integer; correcting the actual vibration attribute curve by using the delay durations of the N actual transformation points to obtain a corrected vibration attribute curve; and acquiring target curve deviation information between the reference vibration attribute curve and the corrected vibration attribute curve, and adjusting a vibration effect of the target object based on the target curve deviation information.

An embodiment of this application provides a computer device. The computer device includes an input device and an output device. The computer device further includes: a processor, suitable for implementing one or more instructions; and a computer storage medium, the computer storage medium stores one or more instructions, and the one or more instructions being suitable to be loaded and executed by the processor to execute the aforementioned vibration evaluation method.

An embodiment of this application provides a non-transitory computer storage medium. The computer storage medium stores one or more instructions, and the one or more instructions are suitable to be loaded and executed by a processor to execute the aforementioned vibration evaluation method.

In the embodiment of this application, the computer device may generate, in a process of controlling a target object to vibrate according to reference vibration attribute information, an actual vibration attribute curve of the target object. The reference vibration attribute information includes reference vibration attribute values at a plurality of timestamps, and the actual vibration attribute curve is generated according to the collected actual vibration attribute values at the plurality of timestamps. Then, one or more delay durations of N actual transformation points are determined according to a time difference between a reference vibration attribute curve corresponding to the reference vibration attribute information and the actual vibration attribute curve, and the actual vibration attribute curve is corrected by using the delay durations of the N actual transformation points to obtain the corrected vibration attribute curve. In addition, target curve deviation information between the reference vibration attribute curve and the corrected vibration attribute curve may be acquired, and evaluation processing may be performed on a vibration effect of the target object based on the target curve deviation information. In the above vibration evaluation process, the actual vibration attribute curve of the target object is corrected, which can effectively improve the accuracy and the reliability of correcting the vibration attribute curve, so that the corrected vibration attribute curve can accurately reflect an actual vibration situation of the target object to a certain extent. Therefore, when the vibration effect of the target object is evaluated according to the curve deviation information between the corrected vibration attribute curve and the reference vibration attribute curve, an error of the curve deviation information can be effectively reduced, and the accuracy of the curve deviation information can be improved, thereby reducing an evaluation error of a vibration effect of the target object, and improving the accuracy of an evaluation result of the vibration effect of the target object.

BRIEF DESCRIPTION OF THE DRAWINGS

To describe the technical solutions in the embodiments of this application or in the prior art more clearly, the following briefly introduces the drawings for describing the embodiments or the prior art. Apparently, the drawings in the following description show merely some embodiments of this application, and a person of ordinary skill in the art may still derive other drawings from the drawings without creative efforts.

FIG. 2 is a schematic flowchart of a vibration evaluation method provided by an embodiment of this application.

FIG. 3A is a schematic diagram of a reference vibration attribute curve and an actual vibration attribute curve provided by an embodiment of this application.

FIG. 5 is a schematic flowchart of another vibration evaluation method provided by an embodiment of this application.

DESCRIPTION OF EMBODIMENTS

The technical solutions in embodiments of this application are clearly and completely described in the following with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

Figure 1A:
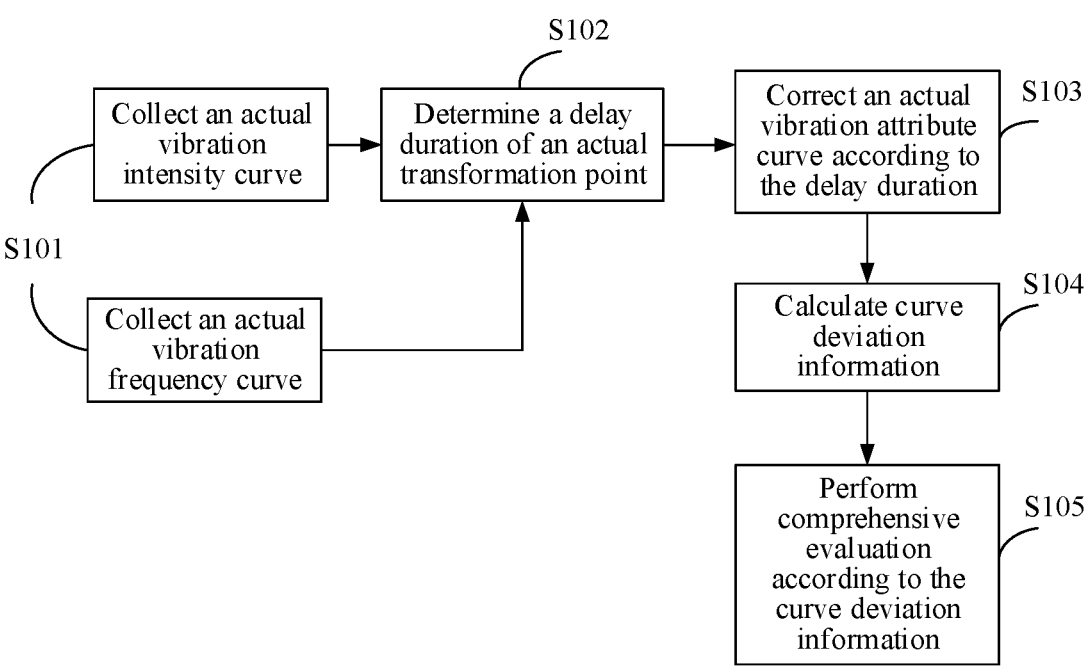
FIG. 1A is a schematic flowchart of a vibration evaluation method provided by an embodiment of this application.

In the embodiment of this application, any vibration component that can vibrate is referred to a target object. In order to evaluate a vibration effect of the target object, the embodiment of this application provides a vibration evaluation method. Referring to FIG. 1A, a principle of the vibration evaluation method is as follows: a device where the target object is located may be invoked to control, according to reference vibration attribute curve corresponding to reference vibration attribute curves such as a reference vibration intensity curve and a reference vibration frequency curve, the target object to vibrate. During vibrating of the target object, an actual vibration attribute curve of the target object may be collected at step S101. The actual vibration attribute curve may include one or more of the reference vibration intensity curve and the reference vibration frequency curve, so step S101 may include collecting an actual vibration intensity curve and collecting an actual vibration frequency curve. Then, in step S102, for each actually collected actual vibration attribute curve, a delay duration of an actual transformation point (for example, a turning point of a curve) in each actual vibration attribute curve may be determined. In step S103, each actual vibration attribute curve is corrected according to the delay duration of each actual transformation point in each actual vibration attribute curve, so as to obtain a corrected actual vibration attribute curve (subsequently referred to as a corrected vibration attribute curve). Then, in step S104, curve deviation information may be calculated according to each corrected vibration attribute curve and the corresponding reference vibration attribute curve (for example, the reference vibration intensity curve and the reference vibration frequency curve), so that a vibration effect of the target object is comprehensively evaluated and adjusted according to the calculated curve deviation information in step S105. A vibration starting time involved in an actual vibration process of the target object may be different from a vibration starting time indicated by the reference vibration attribute information, and a vibration end time involved in the actual vibration process of the target object may also be different from a vibration end time indicated by the reference vibration attribute information.

Figure 1B:
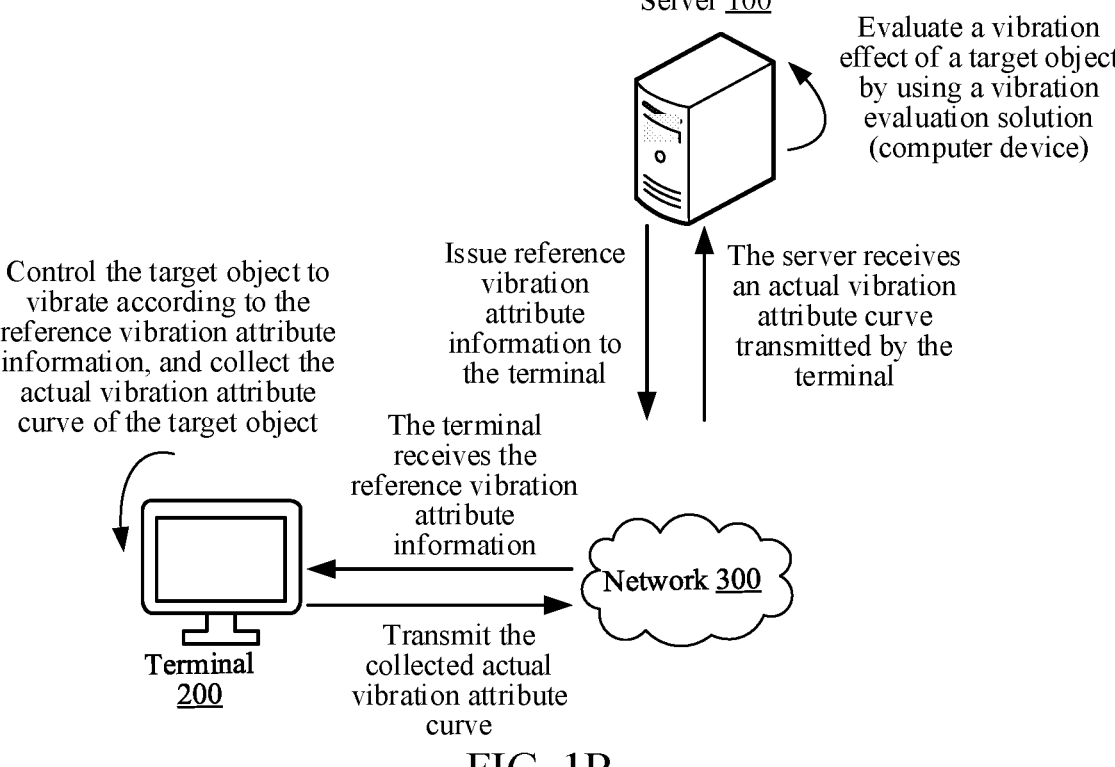
FIG. 1B is an architecture diagram of a vibration evaluation system provided by an embodiment of this application.

In some embodiments, an execution subject of the vibration evaluation method mentioned above may be a computer device. The computer device may be a terminal or a server. The terminal mentioned herein may be devices such as a smartphone, a tablet computer, a laptop computer, and a desktop computer, or may also be external devices such as a joystick and a touch screen. The above server may be an independent physical server, may also be a server cluster or a distributed system composed of a plurality of physical servers, may also be a cloud server providing basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform, or the like. When the computer device is a server 100, if the device where the target object is located is a certain terminal 200, then the computer device may issue, through a network 300, the reference vibration attribute information to the terminal 200 where the target object is located when implementing the vibration evaluation method mentioned above, so that the terminal 200 controls the target object to vibrate according to the reference vibration attribute information. In this case, the terminal may collect the actual vibration attribute curve of the target object, and upload the collected one or more actual vibration attribute curves to the server 100, so that the server 100 collects the one or more actual vibration attribute curves, as shown in FIG. 1B. Alternatively, the vibration evaluation method mentioned above may also be implemented by the terminal and the server together. The terminal may be a terminal with a built-in target object. For example, after collecting the actual vibration attribute curve of the target object, the terminal may also determine the delay duration of an actual transformation point (for example, a turning point of a curve) in each actual vibration attribute curve. Then, each collected actual vibration attribute curve and the delay duration of the actual transformation point in each actual vibration attribute curve are uploaded to the server. The server may directly execute a correction operation of a curve, a calculation operation of curve deviation information, an evaluation operation of a vibration effect, and the like according to received data. For another example, after collecting the actual vibration attribute curve, the terminal may also execute a calculation operation for the delay duration of the actual transformation point, the correction operation of the curve, and the like. Then, the terminal uploads the corrected actual vibration attribute curve (that is, a corrected vibration attribute curve) to the server, so that the server may directly execute the calculation operation of the curve deviation information according to the received corrected vibration attribute curve, an evaluation operation of the vibration effect, and the like. When the vibration evaluation method is implemented by the terminal and the server together, the terminal and the server may be directly or indirectly connected in a wired or wireless communication mode. No limits are made thereto in the embodiments of this application.

Practice shows that the vibration evaluation solution provided by the embodiment of this application may have the following beneficial effects: (1) the actual vibration attribute curve of the target object is corrected, which can effectively improve the accuracy and the reliability of the corrected actual vibration curve, so that the corrected actual vibration attribute curve can accurately reflect an actual vibration situation of the target object to a certain extent. Therefore, when the vibration effect of the target object is evaluated according to the curve deviation information between the corrected actual vibration attribute curve and the reference vibration attribute curve, an error of the curve deviation information can be effectively reduced, and the accuracy of the curve deviation information can be improved, thereby reducing an evaluation error of the vibration effect of the target object, and improving the accuracy of an evaluation result of the vibration effect of the target object. (2) The vibration evaluation solution supports horizontal comparison of vibration effects under different hardware conditions and different software conditions. Meanwhile, under the same software and hardware condition, there is a time difference between vibration effects generated by controlling the target object to vibrate through different reference vibration attribute information, and then the vibration evaluation solution may support accurate evaluation of the vibration effects corresponding to the different reference vibration attribute information, so as to realize a design of reverse guidance for the vibration effects by using accurate evaluation results and maximize an optimal effect of hardware.

The embodiment of this application provides a vibration evaluation method. The vibration evaluation method may be implemented by the computer mentioned above. The computer device may be a terminal or a server. Alternatively, the vibration evaluation method may be implemented by the terminal and the server together. In order to facilitate description, the embodiment of this application is described by taking an example in which the vibration evaluation method is implemented by the computer device. Referring to FIG. 2, the vibration evaluation method may include the following steps S201 to S204:

S201: Generate, in a process of controlling a target object to vibrate according to reference vibration attribute information, an actual vibration attribute curve of the target object.

The target object refers to any component that may vibrate, for example, a motor and an elastic sheet. In the embodiment of this application, the target object may be controlled to vibrate according to the reference vibration attribute information when a device where the target object is located detects a vibration triggering event about the target object. The vibration triggering event may be set according to a service requirement or an experience value. For example, the vibration triggering event may be an event that a target game operation is detected during running a target game when the target object is the motor or the elastic sheet built in a terminal. The target game operation mentioned here may be, for example: in a racing game, game operations of controlling a racing vehicle to start, drift, or collide with another racing vehicle are detected; alternatively, may be, for example: in a competitive games, game operations of using game props such as knives, firearms, swords, and halberds, and the like. For another example, when the target object is an elastic sheet built in a massage chair, the vibration triggering event may be: an event that the massage chair is started is detected. For still another example, when the target object is an elastic sheet built in an earphone, the vibration triggering event may be: an operation of controlling the earphone to play music is detected, and the like. In addition, the reference vibration attribute information mentioned herein may be directly set according to actual demand, or may be obtained by parsing a reference vibration attribute curve set based on the actual demand.

The vibration effect of the target object is usually used for reflecting whether the actual vibration situation of the target object has reached an expected situation indicated by the reference vibration attribute information. Therefore, in order to evaluate the vibration effect of the target object, the computer device may collect an actual vibration attribute curve of the target object in a process that the device where the target object is located controls the target object to vibrate according to the reference vibration attribute information, so as to facilitate evaluation of the vibration effect of the target object by the computer device according to the actual vibration attribute curve. The reference vibration attribute information may be the above preset vibration attribute information. The reference vibration attribute information may include reference vibration attribute values at a plurality of timestamps. The reference vibration attribute values may include: one or more of a reference vibration intensity value in a vibration intensity dimension and a reference vibration frequency value in a vibration frequency dimension.

In some embodiments, the computer device may acquire actual vibration attribute values at a plurality of timestamps in a vibration process of the target object, and generate a corresponding actual vibration attribute curve by using the actual vibration attribute values at the plurality of timestamps after collecting the actual vibration attribute values of the plurality of timestamps. It is to be understood that if the device where the target object is located and the computer device are the same device, the computer device may directly collect the actual vibration attribute values of the target object at the plurality of timestamps. Alternatively, the computer device may be connected with a vibration signal collection device, so as to collect the actual vibration attribute values of the target object at the plurality of timestamps through the vibration signal collection device. If the device where the target object is located and the computer device are not the same device, then the computer device may notify the device where the target object is located to collect the actual vibration attribute values of the target object at the plurality of timestamps. The device where the target object is located may directly perform an operation on the attribute values, or may be connected to a vibration signal collection device to realize the collection of the actual attribute values through the vibration signal collection device. The vibration signal collection device mentioned herein may be, for example, a filter, or other devices.

The reference vibration attribute value may include one or more vibration attribute values in one or more vibration dimensions. The actual vibration attribute value may include the vibration attribute values in one or more vibration dimensions. The vibration attribute values in various vibration dimensions included in the reference vibration attribute value are in one-to-one correspondence with the vibration attribute values in various vibration dimensions included in the actual vibration attribute value. The vibration dimension includes: a vibration intensity dimension, a vibration frequency dimension, and other vibration dimensions.

The vibration dimension includes one or more of the vibration intensity dimension and the vibration frequency dimension, which will be exemplarily described below.

If the reference vibration attribute value includes: the reference vibration intensity value in the vibration intensity dimension, the actual vibration attribute value also includes: the actual vibration intensity value in the vibration intensity dimension, and the actual vibration attribute curve is a vibration curve in the vibration intensity dimension. If the reference vibration attribute value includes: the reference vibration frequency value in the vibration frequency dimension, the actual vibration attribute value also includes: the actual vibration frequency value in the vibration frequency dimension, and the actual vibration attribute curve is a vibration curve in the vibration frequency dimension. If the reference vibration attribute value includes: the reference vibration intensity value in the vibration intensity dimension and the reference vibration frequency value in the vibration frequency dimension, the actual vibration attribute value also includes: the actual vibration intensity value in the vibration intensity dimension and the actual vibration frequency value in the vibration frequency dimension, and the actual vibration attribute curve is also a vibration curve in the vibration intensity dimension and a vibration curve in the vibration frequency dimension.

S202: Determine one or more delay durations of N actual transformation points according to a time difference between a reference vibration attribute curve of the reference vibration attribute information and the actual vibration attribute curve.

Figure 3B:
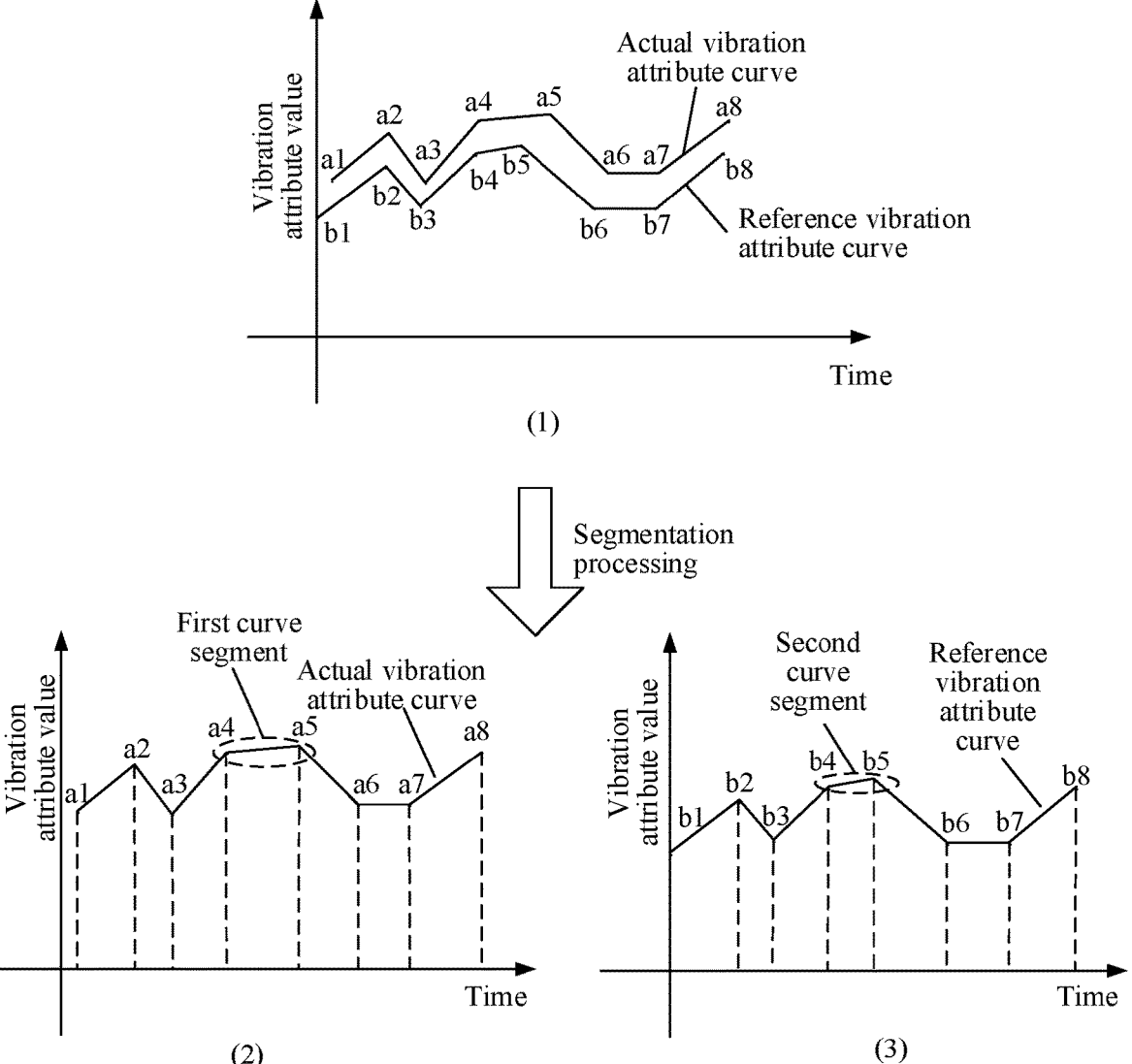
FIG. 3B is a schematic diagram of segmenting for the reference vibration attribute curve and the actual vibration attribute curve provided by an embodiment of this application.

The reference vibration attribute curve is generated according to the reference vibration attribute values at the plurality of timestamps. The N actual transformation points may include: each turning point in the actual vibration attribute curve, and one or more of a starting point and an end point in the actual vibration attribute curve. N is a positive integer. For example, two curves in FIG. 3A are respectively a reference vibration attribute curve and an actual vibration attribute curve, a2, a3, a4, a5, a6, and a7 in FIG. 3A are turning points included in the actual vibration attribute curve, a1 is a starting point of the actual vibration attribute curve, and a8 is an end point of an actual vibration attribute curve. The N actual transformation points may include: a2, a3, a4, a5, a6, and a7; alternatively, may include: a1, a2, a3, a4, a5, a6, and a7; alternatively, may include: a2, a3, a4, a5, a6, a7, and a8; alternatively, may include: a1, a2, a3, a4, a5, a6, a7, and a8.

It is to be understood that, the target object is controlled in a vibration process according to the reference vibration attribute information, the actual vibration attribute curve corresponding to the target has the same basic structure as the reference vibration attribute curve corresponding to the reference vibration attribute information. If the difference is too great (for example, exceeding a structural deviation threshold), then the vibration performance of the terminal may be relatively poor. The basic structure of the reference vibration attribute curve (the actual vibration attribute curve) is determined based on information such as the trend, the change trend, the reference transformation points, and the number of the reference transformation points of the reference vibration attribute curve (or the actual vibration attribute curve). The difference between the actual vibration attribute curve and the reference vibration attribute curve refers to the deviation between the basic structure of the actual vibration attribute curve and the basic structure of the reference vibration attribute curve. If the deviation is greater than the structural deviation threshold, it indicates that the difference between the actual vibration attribute curve and the reference vibration attribute curve is too great. When the actual vibration attribute curve includes N actual transformation points, the reference vibration attribute curve may also include N reference transformation points. In some embodiments, the basic structures of the actual vibration attribute curve and the reference vibration attribute curve may also be different, and the number of the reference transformation points included in the reference vibration attribute curve may be greater than N or less than N. The embodiment of this application is described by taking an example in which the actual vibration attribute curve includes N actual transformation points, and the reference vibration attribute curve includes N reference transformation points. Similarly, the N reference transformation points may include: each turning point in the reference vibration attribute curve, and a starting point or an end point in the reference vibration attribute curve. As shown in FIG. 3A, b2, b3, b4, b5, b6, and b7 are turning points included in the reference vibration attribute curve, b1 is a starting point of the reference vibration attribute curve, and b8 is an end point of the reference vibration attribute curve. One reference transformation point may correspond to one actual transformation point. Reference transformation point b3 in FIG. 3A corresponds to actual transformation point a3.

In some embodiments, for any actual transformation point in the N actual transformation points, taking the $n^{th}$ actual transformation point as an example, an implementation manner for determining a delay duration of an $n^{th}$ actual transformation point may include: a computer device determines a timestamp of the $n^{th}$ reference transformation point in the reference vibration attribute curve, and determines a timestamp of the $n^{th}$ actual transformation point in the actual vibration attribute curve; and $n \in [1, N]$. After the timestamp of the $n^{th}$ reference transformation point and the timestamp of the actual transformation point are obtained, the delay duration of the $n^{th}$ actual transformation point may be determined according to the timestamp of the $n^{th}$ reference transformation point and the timestamp of the $n^{th}$ actual transformation point. For example, a time difference between the timestamp of the $n^{th}$ reference transformation point and the timestamp of the actual transformation point may be taken as the delay duration of the $n^{th}$ actual transformation point.

For example, as shown in FIG. 3A, it is assumed that the $n^{th}$ reference transformation point is b5, and the $n^{th}$ actual transformation point is a5. The computer device may determine that the time corresponding to timestamp 1 of b5 is 10 ms, and the time corresponding to timestamp 2 of a5 is 12 ms. After obtaining the time corresponding to time 1 and the time corresponding to time 2, the computer device may calculate a time difference between timestamp 1 and timestamp 2. A time difference 2 ms between timestamp 1 and timestamp 2 may be calculated, and the computer device may take 2 ms as the delay duration of actual transformation point b5.

S203: Correct the actual vibration attribute curve by using the delay durations of the N actual transformation points to obtain a corrected vibration attribute curve.

In order to facilitate the calculation of subsequent target curve deviation information, the reference vibration attribute curve may usually be compared with the actual vibration attribute curve within the same duration range to obtain the target curve deviation information. Due to certain factors, the actual vibration attribute curve is shifted to the left on the whole relative to the reference vibration attribute curve due to delay start. Then, the actual vibration attribute curve is subjected to correction. The correction may be translation processing, so as to obtain the corrected vibration attribute curve. The corrected vibration attribute curve and the reference vibration attribute curve are within the same duration range.

In some embodiments, the computer device may divide the actual vibration attribute curve into a plurality of curve segments, so as to correct each curve segment to obtain a corrected actual vibration attribute curve. The corrected actual vibration attribute curve may be referred to as the corrected vibration attribute curve. The corrected vibration attribute curve includes each corrected curve segment. During correcting, the actual vibration attribute curve is corrected by taking the reference vibration attribute curve as a reference. Considering that the actual vibration attribute curve is divided into a plurality of curve segments during correcting, the reference vibration attribute curve may also be divided into a plurality of curve segments correspondingly.

In some embodiments, the actual vibration attribute curve may include N actual transformation points, and the reference vibration attribute curve may include N reference transformation points. Then, the computer device may perform segmentation processing on the actual vibration attribute curve by using the N actual transformation points to obtain a plurality of first curve segments. Any two adjacent first curve segments in the actual vibration attribute curve are connected by using one actual transformation point. Similarly, the computer device may also perform segmentation processing on the reference vibration attribute curve by using the N reference transformation points to obtain a plurality of second curve segments. Any two adjacent second curve segments in the reference vibration attribute curve are connected by using one reference transformation point.

Considering different definitions of the N actual transformation points, for example, the N actual transformation points may include each turning points in the actual vibration attribute curve, or, may include each turning points in the actual vibration attribute curve and the starting point and the end point in the actual vibration attribute curve, or may include each turning points in the actual vibration attribute curve and the starting point or the end point in the actual vibration attribute curve. Segmentation processing may be performed on the actual vibration attribute curves in different modes, so as to obtain a plurality of first curve segments.

In one implementation, it is assumed that the N actual transformation points include each turning point in the actual vibration attribute curve, and the starting point and the end point in the actual vibration attribute curve. An implementation manner that the computer device performs segmentation processing on the actual vibration attribute curve by using the N actual transformation points may be that: a curve segment between two adjacent actual transformation points may be determined as a first curve segment. The actual vibration attribute curve may be divided into N−1 first curve segments by the N actual transformation points. For example, taking the actual vibration attribute curve as shown in a coordinate system corresponding to (1) in FIG. 3B as an example, the number of the actual transformation points included in the actual vibration attribute curve is N=8. When the segmentation processing is performed on the actual vibration attribute curve by using the 8 actual transformation points, the actual vibration attribute curve which is divided into 7 first curve segments in the coordinate system corresponding to (2) in FIG. 3B may be obtained. For example, the curve segment between a4 and a5 is a first curve segment.

In one implementation, it is assumed that the N actual transformation points include each turning point in the actual vibration attribute curve, and the starting point or the end point in the actual vibration attribute curve. The actual vibration attribute curve may be divided into N first curve segments by the N actual transformation points. It is assumed that the N actual transformation points include each turning point in the actual vibration attribute curve. The actual vibration attribute curve may be divided into N+1 first curve segments by the N actual transformation points.

Similarly, an implementation manner that the computer device performs the segmentation processing on the reference vibration attribute curve to obtain a plurality of second curve segments is similar to the implementation manner of performing the segmentation processing on the actual vibration attribute curve to obtain the plurality of first curve segments. Then, the implementation manner of performing the segmentation processing on the reference vibration attribute curve may refer to the above implementation manner of performing the segmentation processing on the actual vibration attribute curve. For example, taking the reference vibration attribute curve as shown in a coordinate system corresponding to (1) in FIG. 3B as an example, the number of the reference transformation points included in the reference vibration attribute curve is N=8. When the segmentation processing is performed on the reference vibration attribute curve by using the 8 reference transformation points, the actual vibration attribute curve which is divided into 7 second curve segments in the coordinate system corresponding to (3) in FIG. 3B may be obtained. For example, the curve segment between b4 and b5 is a second curve segment. The second curve segment has a one-to-one correspondence with the first curve segment, for example, the second curve segment formed by the curve segment between b4 and b5 corresponds to the first curve segment formed by the curve segment between a4 and a5.

After obtaining the plurality of first curve segments and the plurality of second curve segments, the computer device may determine, according to the delay duration of the actual transformation point corresponding to each first curve segment, a delay duration between each first curve segment and a corresponding second curve segment. The actual transformation point corresponding to the first curve segment may be understood as the starting point corresponding to the first curve segment. The delay duration of the actual transformation point corresponding to each first curve segment may be taken as the delay duration between the each first curve segment and the corresponding second curve segment. For example, the delay duration of the actual transformation point corresponding to a certain first curve segment is 2 ms, and the delay duration between the certain first curve segment and the corresponding second curve segment is 2 ms.

Figure 3C:
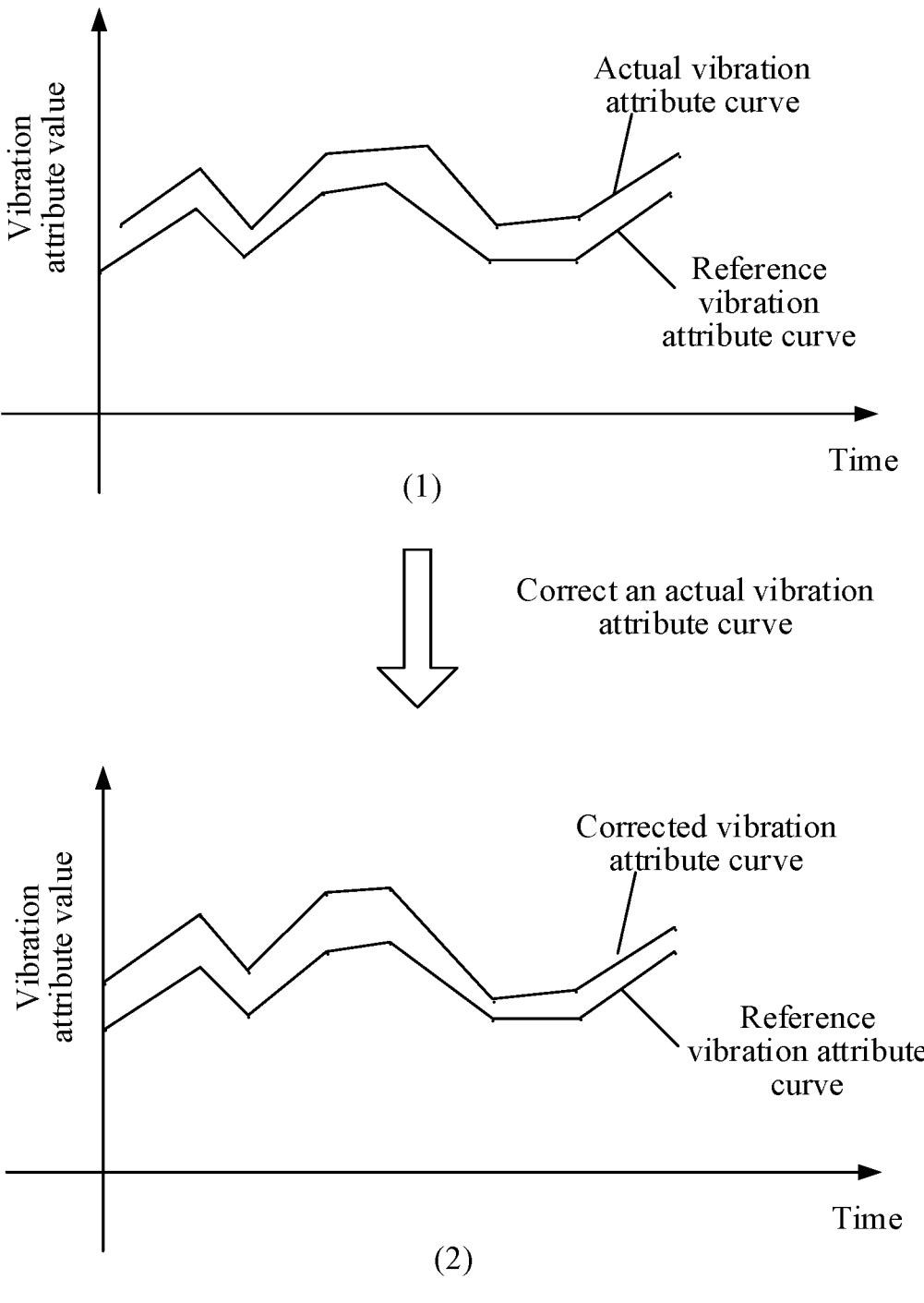
FIG. 3C is a schematic diagram of correcting an actual vibration attribute curve provided by an embodiment of this application.

In some embodiments, the each first curve segment may be corrected according to the delay duration between the each first curve segment and the corresponding second curve segment to obtain the corrected vibration attribute curve. The corrected vibration attribute curve includes various corrected first curve segments, and each corrected first curve segment is aligned with the corresponding second curve segment. For any corrected first curve segment, the corrected first curve segment being aligned with the corresponding second curve segment may be understood as that the timestamp corresponding to the starting point of the corrected first curve segment is the same as the timestamp corresponding to the starting point of the second curve segment, and the timestamp corresponding to the end point of the corrected first curve segment is the same as the timestamp corresponding to the end point of the second curve segment. For example, the coordinate system corresponding to FIG. (1) in FIG. 3C displays the reference vibration attribute curve and the actual vibration attribute curve, and the coordinate system corresponding to FIG. (2) in FIG. 3C displays the reference vibration attribute curve and the corrected vibration attribute curve. It can be seen from FIG. 3C that compared with the actual vibration attribute curve, various first curve segments included in the corrected vibration attribute curve are aligned with the corresponding second curve segments.

In one implementation, taking the correction of any curve segment of the plurality of first curve segments as an example for description, an implementation manner of correcting each first curve segment according to the delay duration between an $i^{th}$ first curve segment and the corresponding second curve segment may be: first, a translation parameter of the $i^{th}$ first curve segment is determined according to the delay duration between the $i^{th}$ first curve segment and the corresponding second curve segment. The translation parameter may include a translation direction and a translation length. The translation direction may be leftwards, referring to a two-dimensional coordinate system, the translation direction may be a negative x-axis direction, and the translation length may be the delay duration between the $i^{th}$ first curve segment and the corresponding second curve segment. Translation processing may be performed on the $i^{th}$ first curve segment by using the translation parameter after the translation parameter of the $i^{th}$ first curve segment is determined. In the embodiment of this application, an implementation manner of performing translation processing on the $i^{th}$ first curve segment by using the translation parameter may be: the $i^{th}$ first curve segment is moved towards the translation direction by the above translation length, that is, the $i^{th}$ first curve segment is moved leftwards by the delay duration between the $i^{th}$ first curve segment and the corresponding second curve segment. The above i is a positive integer, and is less than or equal to the number of the first curve segments.

Figure 3D:
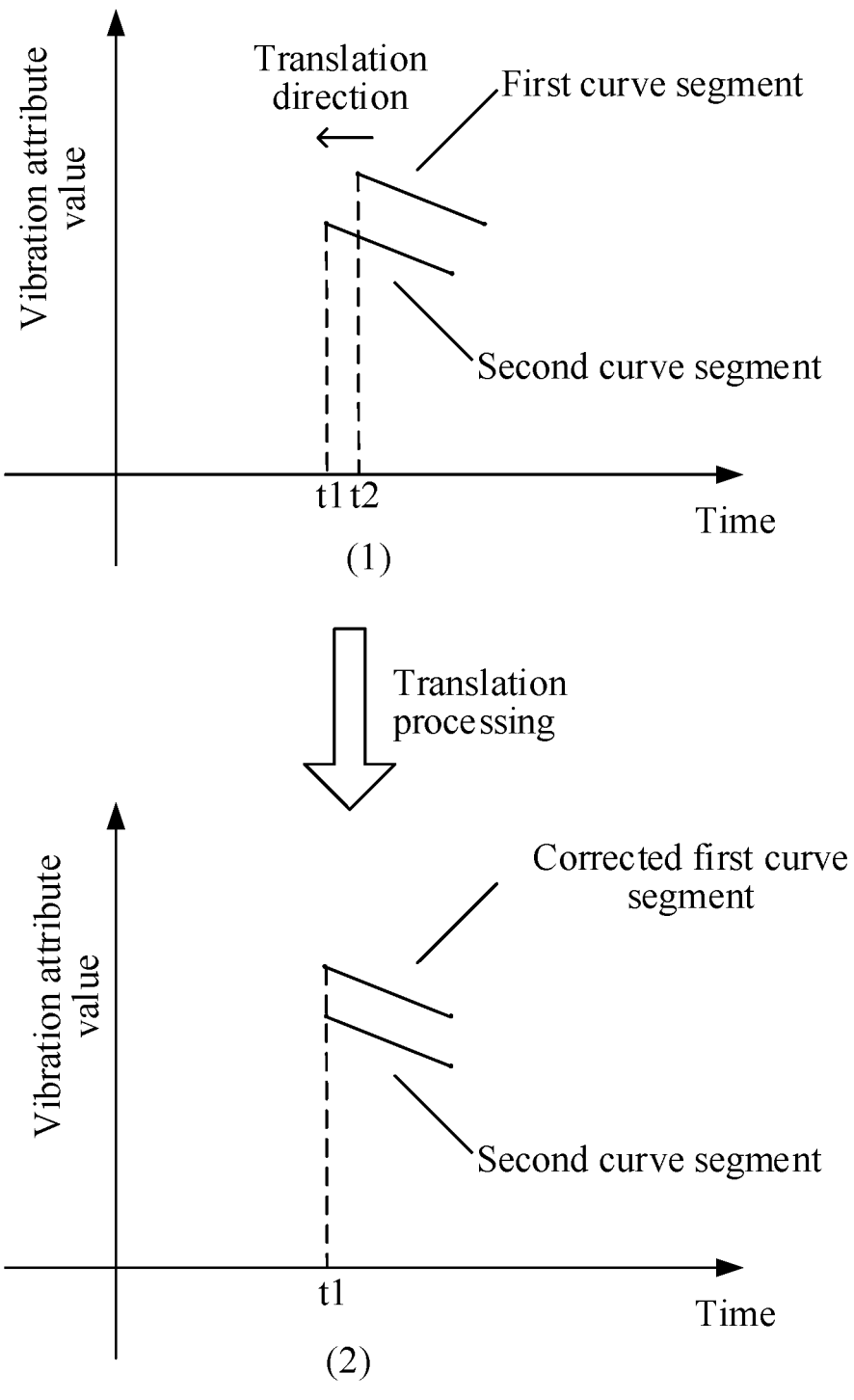
FIG. 3D is a schematic diagram of translating a first curve segment provided by an embodiment of this application.

For example, as the first curve segment and the second curve segment displayed in the coordinate system corresponding to FIG. (1) in FIG. 3D, the translation direction in the translation parameter of the first curve segment is the translation direction (leftwards) as shown in FIG. (1) in FIG. 3D, and the translation length is the delay duration (t2–t1) between the first curve segment and the corresponding second curve segment. Then, the corrected first curve segment displayed in the coordinate system corresponding to FIG. (2) in FIG. 3E may be obtained according to the translation direction (leftwards) and the translation length (t2–t1).

It is to be understood that if the duration range of the first curve segment is the same as the duration range of the corresponding second curve segment, the corrected first curve segment may be aligned with the corresponding second curve segment by performing translation processing on the first curve segment. Alignment refers to that timestamps corresponding to the starting points of the two curve segments are the same, and the timestamps corresponding to the end points of the two curve segments are the same. For example, the duration range of the first curve segment displayed in the coordinate system corresponding to FIG. (1) in FIG. 3D is the same as the duration range of the corresponding second curve segment, and then, the corrected first curve segment is aligned with the second curve segment after the translation processing is performed on the first curve segment. During actual vibration, due to its own trailing, delay start, or trailing of a previous vibration, the actual vibration duration is usually shorter or longer than the reference vibration duration, resulting in that the first curve segment cannot be compared with the corresponding second curve segment within the same duration range. In this case, each first curve segment may be scaled to the same duration range as the second curve segment in an equal scaling manner.

Figure 3E:
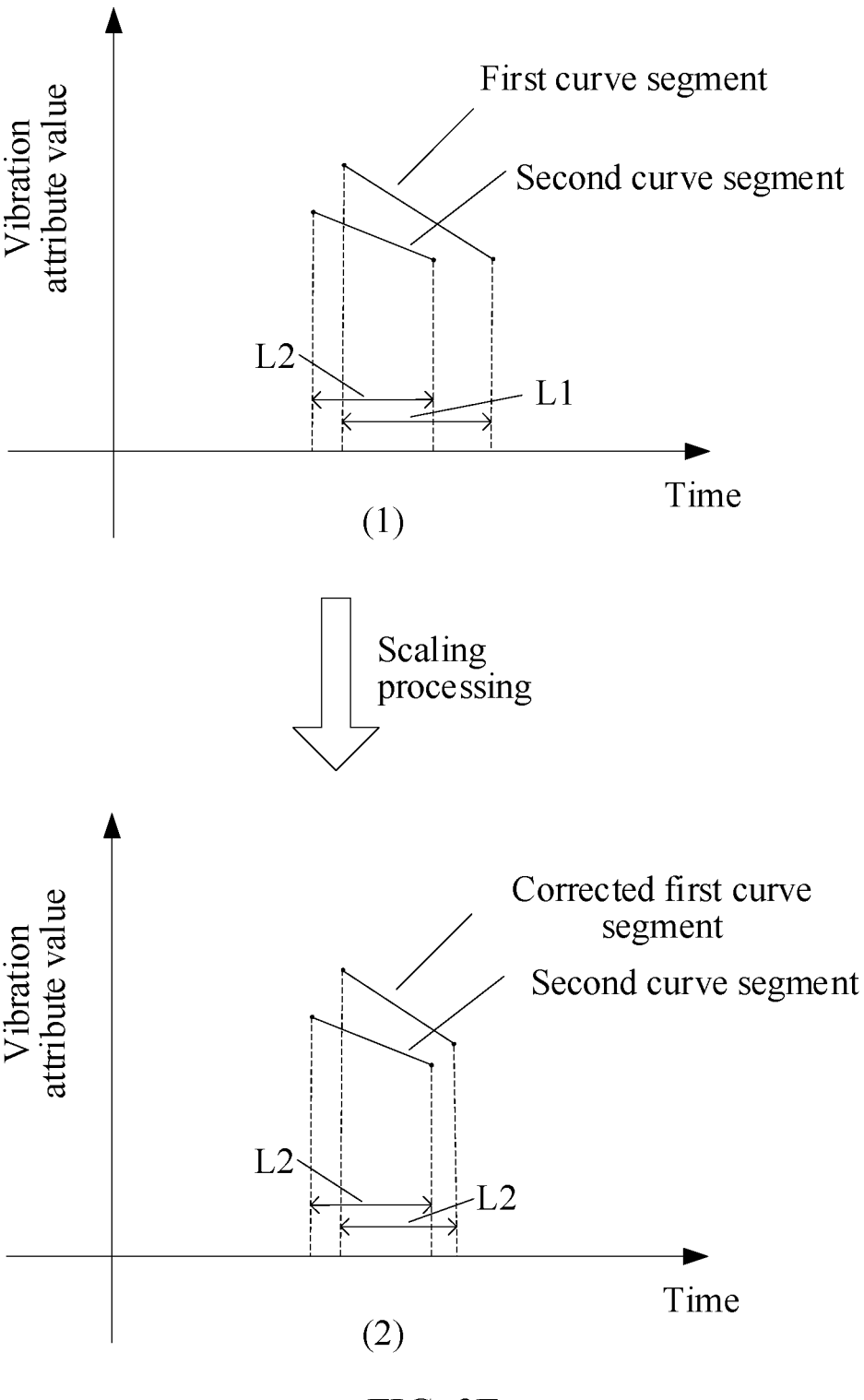
FIG. 3E is a schematic diagram of scaling a first curve segment provided by an embodiment of this application.

If the duration range of the first curve segment is different from the duration range of the corresponding second curve segment, for example, the duration ranges respectively corresponding to the first curve segment and the second curve segment displayed in the coordinate system corresponding to FIG. (1) in FIG. 3E are different, then, the first curve segment needs to be subjected to the translation processing, and also needs to be subjected to scaling processing, so as to ensure that the corrected first curve segment is aligned with the corresponding second curve segment. The duration range may be understood as a time difference between the timestamp corresponding to the starting point of a curve segment and the timestamp corresponding to the end point. For example, if the timestamp corresponding to the starting point of the curve segment is 10 ms and the timestamp corresponding to the end point is 30 ms, then the duration range of the first curve segment is 20 ms (that is, 30 ms–10 ms=20 ms).

If the duration range of the first curve segment is different from the duration range of the corresponding second curve segment, a sequence of performing the translation processing and the scaling processing on the first curve segment is not limited in this application. The translation processing may be performed on the first curve segment first to obtain a translated first curve segment, and then the scaling processing is performed on the translated first curve segment, or the scaling processing may be performed on the first curve segment first to obtain a scaled first curve segment, and then the translation processing is performed on the scaled first curve segment.

In another implementation, taking the correction of any curve segment of the plurality of first curve segments as an example for description, assuming that the duration range of the first curve segment is different from the duration range of the corresponding second curve segment, an implementation manner of correcting each first curve segment according to the delay duration between each first curve segment and the corresponding second curve segment may be: the computer device may determine the duration range corresponding to the $i^{th}$ first curve segment and the duration range corresponding to the corresponding second curve segment. After respective duration ranges are determined, a scaling parameter of the $i^{th}$ first curve segment may be calculated according the duration range corresponding to the $i^{th}$ first curve segment and the duration range corresponding to the corresponding second curve segment. The scaling parameter of the $i^{th}$ first curve segment may be a ratio of the duration range corresponding to the second curve segment to the duration range corresponding to the first curve segment. After calculating the scaling parameter of the $i^{th}$ first curve segment, the computer device may perform the scaling processing on the $i^{th}$ first curve segment by using the scaling parameter, so that the duration ranges of the $i^{th}$ first curve segment and the second curve segment corresponding to the $i^{th}$ first curve are the same. After the scaled first $i^{th}$ first curve segment is obtained, a step of performing the translation processing on the $i^{th}$ first curve segment by using the translation parameter may be triggered. Alternatively, the scaling processing is performed on the $i^{th}$ first curve segment after the translation processing by using the scaling parameter.

For example, as the first curve segment and the second curve segment displayed in the coordinate system corresponding to FIG. (1) in FIG. 3E, the duration range of the first curve segment is L1, and the duration range of the second curve segment is L2, then the scaling parameter for the first curve segment is L2/L1, so that the duration range L1 corresponding to the first curve segment is changed into L2 through the scaling processing. Then, the corrected first curve segment displayed in the coordinate system corresponding to FIG. (2) in FIG. 3E may be obtained according to the scaling parameter L2/L1. The duration range of the corrected first curve segment and the duration range of the second curve segment are both L2.

S204: Acquire target curve deviation information between the reference vibration attribute curve and the corrected vibration attribute curve, and perform evaluation processing on (including adjust) a vibration effect of the target object based on the target curve deviation information.

When the evaluation processing is performed on the vibration effect of the target object, the involved vibration attribute value may include: one or more of a vibration attribute value in a vibration intensity dimension and a vibration attribute value in a vibration frequency dimension. If the reference vibration attribute value includes: a reference vibration intensity value in the vibration intensity dimension, then each of the reference vibration attribute curve and the corrected vibration attribute curve may include a vibration curve in the vibration intensity dimension, and the target curve deviation information may include an indicator value under an intensity deviation indicator. If the reference vibration attribute value includes: a reference vibration frequency value in the vibration frequency dimension, then each of the reference vibration attribute curve and the corrected vibration attribute curve may include a vibration curve in the vibration frequency dimension, and the target curve deviation information may include an indicator value under a frequency deviation indicator. If the reference vibration attribute value includes: the reference vibration intensity value in the vibration intensity dimension and the reference vibration frequency value in the vibration frequency dimension, then each of the reference vibration attribute curve and the corrected vibration attribute curve may include a vibration curve in the vibration intensity dimension and the vibration curve in the vibration frequency dimension, and the target curve deviation information may include an indicator value under an intensity deviation indicator and an indicator value under a frequency deviation indicator.

In some embodiments, the computer device may acquire the target curve deviation information between the reference vibration attribute curve and the corrected vibration attribute curve, so as to perform evaluation processing on a vibration effect of the target object based on the target curve deviation information. In the embodiment of this application, an example in which the target curve deviation information is the indicator value under the intensity deviation indicator and the indicator value under the frequency deviation indicator is taken for description.

In one implementation, for any deviation indicator, the any deviation indicator may be the intensity deviation indicator or the frequency deviation indicator, a calculation manner for the indicator value under the any deviation indicator is described as follows: the computer device may determine an attribute value threshold supported by the target object in a target dimension, when the any deviation indicator is the intensity deviation indicator, then the target dimension may be the vibration intensity dimension, and an attribute value threshold supported in the target dimension is the maximum intensity supported by the target object; when the any deviation indicator is the frequency deviation indicator, then the target dimension may be the vibration frequency dimension, and an attribute value threshold supported in the target dimension is the maximum frequency supported by the target object. In order to facilitate subsequence description, the vibration curve in the target dimension in the reference vibration attribute curve may be determined as a target reference curve, and the vibration curve in the target dimension in the corrected vibration attribute curve may be determined as a target corrected curve.

Then, after acquiring the attribute value threshold, the computer device may calculate the attribute deviation value in the target dimension according to the attribute value threshold, each target reference vibration attribute value indicated by the target reference curve, and a target corrected vibration attribute value indicated by the target corrected curve. The each target reference vibration attribute value indicated by the target reference curve may be: a reference vibration attribute value corresponding to each timestamp included in the target reference curve; and the target corrected vibration attribute value indicated by the target corrected curve may be: a corrected vibration attribute value corresponding to each timestamp included in the target corrected curve. After the attribute deviation value in the target dimension is calculated, the indicator value under the target deviation indicator may be calculated according to the attribute deviation value in the target dimension by using a deviation function under the target deviation indicator corresponding to the target dimension. In some embodiments, the deviation function under the target deviation indicator corresponding to the target dimension may be as shown in Formula 1.1:

$$F = W - \sqrt{H} \qquad \text{Formula (1.1)}$$

F is the indicator value under the target deviation indicator; in order to ensure a final result of the value F may fall within an interval of 0 to 100, W may be set as 100, so as to correct the range; and H is an attribute deviation value in the target dimension. The greater the F, the smaller the deviation of the actual vibration attribute curve, and the better the vibration effect.

In some embodiments, an implementation manner of calculating the attribute deviation value in the target dimension may include: the computer device may calculate a ratio of each target reference vibration attribute value indicated by the target reference curve to the attribute value threshold to obtain a third relative vibration attribute value of the target object at each target timestamp included in the target reference curve. The target reference vibration attribute value is a reference vibration attribute value corresponding to the target timestamp included in the target reference curve. For example, if the target reference vibration attribute value corresponding to a certain timestamp included in the target reference curve is A1, and the attribute value threshold is A0, then the third relative vibration attribute value is A1/A0. The computer device may also calculate a ratio of each target corrected vibration attribute value indicated by the target corrected curve to the attribute value threshold to obtain a fourth relative vibration attribute value of the target object at each target timestamp included in the target corrected curve. The target corrected vibration attribute value is a corrected vibration attribute value corresponding to the target timestamp included in the target corrected curve. For example, if the target corrected vibration attribute value corresponding to a certain timestamp included in the target corrected curve is B1, and the attribute value threshold is B0, then the third relative vibration attribute value is B1/B0. After the third relative vibration attribute value corresponding to each target timestamp and the corresponding fourth relative vibration attribute value are calculated, the attribute deviation value in the target dimension may be calculated according to the difference between the third relative vibration attribute value of the each target timestamp and the corresponding fourth relative vibration attribute value. In some embodiments, the attribute deviation value in the target dimension may be calculated by using a first curve deviation function. The first curve deviation function may be shown as Formula 1.2.

$$H = \frac{\sum_{k=1}^{K}(A-B)^2}{K} \qquad \text{Formula (1.2)}$$

Where, $k \in [1, K]$, K represents the number of target timestamps included in the target reference curve and target corrected curve, A represents the third relative vibration attribute value, and B represents the fourth relative vibration attribute value.

In another implementation, in order to accelerate the data processing speed, segmentation processing may be performed on the target reference curve and target corrected curve to obtain the indicator value in the target dimension according to the curve segment deviation value corresponding to each curve segment obtained after the segmentation processing. In this case, an implementation manner of calculating the attribute deviation value in the target dimension may include: the computer device may divide the target reference curve into M third curve segments and divide the target corrected curve into M fourth curve segments according to a preset duration. Where, M is a positive integer, and one third curve segment corresponds to one fourth curve segment. The above preset duration may be set according to demands, for example, may be any numerical value, such as 5 ms, or 10 ms. When the target reference curve is divided into the M third curve segments and the target corrected curve is divided into the M fourth curve segments according to the preset duration, the duration ranges of various third curve segments in the M third curve segments may be equal, or may be unequal. Similarly, the duration ranges of various fourth curve segments in the M fourth curve segments may be equal, or may be unequal.

Figure 4A:
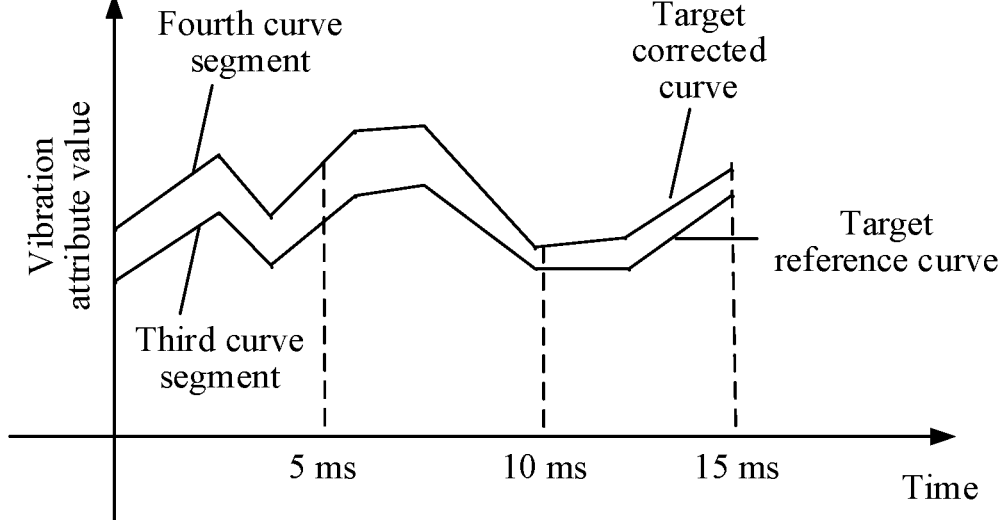
FIG. 4A is a schematic diagram of segmenting a reference vibration attribute curve and a corrected vibration attribute curve provided by an embodiment of this application.
Figure 4B:
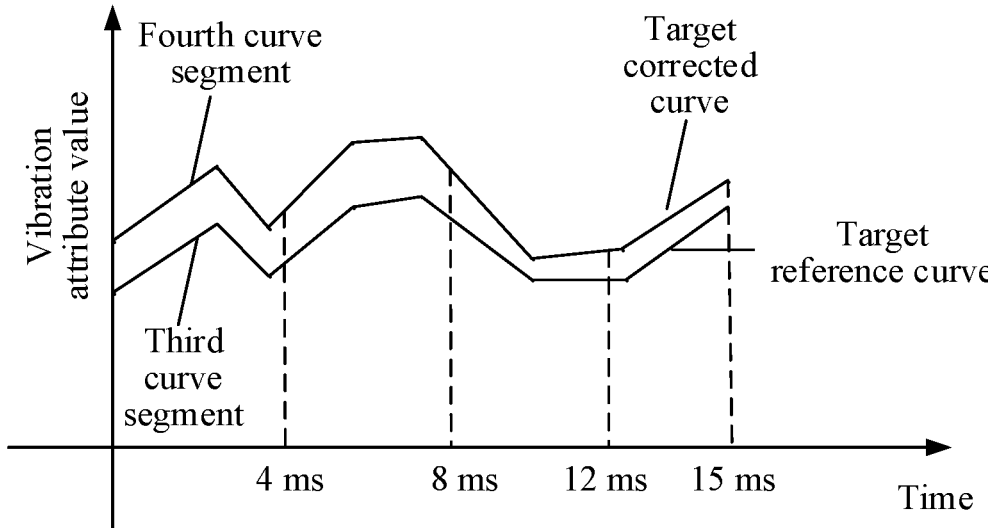
FIG. 4B is another schematic diagram of segmenting a reference vibration attribute curve and a corrected vibration attribute curve provided by an embodiment of this application.

For example, as shown in FIG. 4A, when a total duration range of the duration ranges of the target reference curve and the target corrected curve is 15 ms, and when the preset duration is 5 ms, then M=3, that is, the target reference curve may be divided into 3 third curve segments, and the duration range of each third curve segment is 5 ms. Similarly, the target corrected curve may be divided into 3 fourth curve segments, and the duration range of each fourth curve segment is 5 ms. The third curve segments are in one-to-one correspondence with the fourth curve segments. For example, as shown in FIG. 4B, when the preset duration is 4 ms, then M=4, that is, the target reference curve may be divided into 4 third curve segments, but the duration range of one third curve segment is different from the duration range of other third curve segments in the 4 third curve segments. Similarly, the target corrected curve may be divided into 4 fourth curve segments, but the duration range of one fourth curve segment is different from the duration range of other fourth curve segments in the 4 fourth curve segments. The third curve segments are in one-to-one correspondence with the fourth curve segments.

After the segmentation processing is performed on the target reference curve and the target corrected curve, a curve segment deviation value corresponding to each third curve segment may be calculated according to the attribute value threshold, each target reference vibration attribute value indicated by each third curve segment, and each target corrected vibration attribute value indicated by the corresponding fourth curve segment. After the curve segment deviation value corresponding to each third curve segment is calculated, a mean operation may be performed on the curve segment deviation value corresponding to each third curve segment to obtain the attribute deviation value in the target dimension. The attribute deviation value in the target dimension may be a value obtained by further calculating based on mean operation results, for example, a standard deviation of the mean operation results, a mean square deviation of the mean operation results, and the like. For example, taking the mean operation results as an example, assuming that the curve segment deviation values corresponding to the M third curve segments are respectively H1, H2, ..., Hm, ..., HM, then the attribute deviation value in the target dimension is H=(H1+H2+, ..., +Hm+, ..., +HM)/M.

In one implementation, taking the $m^{th}$ third curve segment in the M third curve segments as an example, $m \in [1, M]$, the implementation for calculating the curve segment deviation value corresponding to the $m^{th}$ third curve segment may be described as follows: the computer device may calculate a ratio of each target reference vibration attribute value indicated by the $m^{th}$ third curve segment to the attribute value threshold to obtain a first relative vibration attribute value of the target object at each target timestamp. The target timestamp may refer to: a timestamp corresponding to the target reference vibration attribute value. The computer device may also calculate a ratio of each target reference vibration attribute value indicated by the $m^{th}$ fourth curve segment to the attribute value threshold to obtain a second relative vibration attribute value of the target object at each target timestamp. After the first relative vibration attribute value corresponding to each target timestamp and the corresponding second relative vibration attribute value are calculated, the curve segment deviation value corresponding to the $m^{th}$ third curve segment may be calculated according to the difference between the first relative vibration attribute value of the each target timestamp and the corresponding second relative vibration attribute value. In the embodiment of this application, the curve segment deviation value corresponding to the $m^{th}$ third curve segment may be calculated by using a second curve deviation function. The second curve deviation function may be shown as Formula 1.3.

17

$$H_m = \frac{\sum_{j=1}^{J}(C-D)^2}{J}$$

Formula (1.3)

Where, $j \in [1, J]$, J represents the number of target timestamps included in the $m^{th}$ third curve segment and the $m^{th}$ fourth curve segment, C represents the first relative vibration attribute value, and D represents the second relative vibration attribute value. $H_m$ Hm is an attribute deviation value of the $m^{th}$ third curve segment and the $m^{th}$ fourth curve segment in the target dimension.

After the curve segment deviation values corresponding to the M third curve segments are calculated, the curve segment deviation values corresponding to all third curve segments may be calculated in sequence in a serial manner, or the curve segment deviation values corresponding to all third curve segments may be calculated in sequence in a parallel manner. When the curve segment deviation values corresponding to all third curve segments are calculated in sequence in the parallel manner to obtain the attribute deviation value in the target dimension, the data calculation speed may be effectively accelerated, thereby improving the speed of evaluating the vibration effect of the target object.

After the target curve deviation information is acquired, evaluation processing may be performed on the vibration effect of the target object based on the target curve deviation information. The target curve deviation information may include: one or more of an indicator value under an intensity deviation indicator and an indicator value under a frequency deviation indicator. In the embodiment of this application, an example in which the target curve deviation information includes the indicator value under the intensity deviation indicator and the indicator value under the frequency deviation indicator is taken for description. The implementation for performing the evaluation processing on the vibration effect of the target object based on the target curve deviation information may include: the computer device may acquire a weight of the intensity deviation indicator and a weight of the frequency deviation indicator first. The weights of various indicators may be preset according to actual demands in different application scenarios, and the numerical values corresponding to the weights are not limited in this application. After the corresponding weights are acquired, weighted summation may be performed on the indicator value under the intensity deviation indicator and the indicator value under the frequency deviation indicator by using the weight of the intensity deviation indicator and the weight of the frequency deviation indicator so as to obtain a vibration effect description value of the target object. The vibration effect description value may be positively correlated with the vibration effect. In the embodiment of this application, the vibration effect description value of the target object may be obtained by using a first vibration effect function. The first vibration effect function may be as shown in Formula 1.4.

$$F = \left(1 - \frac{1}{1 + e^{(c_1 \times Fhz + c_2 \times Fin)}}\right) \times 100$$

Formula (1.4)

Where, $F \in [1, 100]$, Fhz is an indicator value under the frequency deviation indicator, Fin is an indicator value under the intensity deviation indicator, $c_1$ is the weight of the frequency deviation indicator, $c_2$ is the weight of the intensity deviation indicator, and $c_1$ and $c_2$ may be adjusted according to different application scenarios.

A value may be calculated according to Formula (1.4), and the value is the vibration effect description value of the target object. The vibration effect description value is positively correlated with the vibration effect, that is, the greater the value F, the better the vibration effect of the target object, and correspondingly, the smaller the value F, the poorer the vibration effect of the target object.

In the embodiment of this application, the computer device corrects the actual vibration attribute curve of the target object, which can effectively improve the accuracy and the reliability of the corrected actual vibration curve, so that the corrected actual vibration curve can accurately reflect an actual vibration situation of the target object to a certain extent. Therefore, when the vibration effect of the target object is evaluated according to the curve deviation information between the corrected actual vibration attribute curve and the reference vibration attribute curve, an error of the curve deviation information can be effectively reduced, and the accuracy of the curve deviation information can be improved, thereby reducing an evaluation error of the vibration effect of the target object, and improving the accuracy of an evaluation result of the vibration effect of the target object. The vibration evaluation method supports horizontal comparison of vibration effects under different hardware conditions and different software conditions.

In the embodiment of this application, under the same software and hardware condition, there is a time difference between vibration effects generated by controlling the target object to vibrate through different reference vibration attribute information, and then the vibration evaluation method may support accurate evaluation of the vibration effects corresponding to the different reference vibration attribute information, so as to realize a design of reverse guidance for the vibration effects by using accurate evaluation results and maximize an optimal effect of hardware. In addition, the vibration evaluation solution supports horizontal comparison of vibration effects under different hardware conditions and different software conditions.

Refer to FIG. 5, which is a schematic flowchart of a vibration evaluation method provided by the embodiment of this application. The vibration evaluation method described in this embodiment may be implemented by the computer device. The computer device may be a terminal or a server. Alternatively, the vibration evaluation method may be implemented by the terminal and the server together. In order to facilitate description, the embodiment of this application is described by taking an example in which the vibration evaluation method is implemented by the computer device. The vibration evaluation method may include the following steps S501 to S506:

S501: Generate, in a process of controlling a target object to vibrate according to reference vibration attribute information, an actual vibration attribute curve of the target object.

S502: Determine one or more delay durations of N actual transformation points according to a time difference between a reference vibration attribute curve of the reference vibration attribute information and the actual vibration attribute curve.

S503: Correct the actual vibration attribute curve by using the delay durations of the N actual transformation points to obtain a corrected vibration attribute curve.

S504: Acquire target curve deviation information between the reference vibration attribute curve and the corrected vibration attribute curve.

S505: Acquire reference curve deviation information between the reference vibration attribute curve and the actual vibration attribute curve.

Here, the reference curve deviation information between the reference vibration attribute curve and the actual vibration attribute curve may include one or more of an indicator value under the delay indicator and an indicator value under a trailing indicator. One or more of the indicator value under the delay indicator and the indicator value under the trailing indicator may be acquired as the reference curve deviation information.

In one implementation, an implementation manner of acquiring the indicator value under the delay indicator may include: the computer device performs a mean operation on the delay durations of the N actual transformation points to obtain an average delay duration of the target object. A determination manner of the delay duration of the N actual transformation points may refer to the above description. For example, the delay durations of the N actual transformation points are respectively $x_1, x_2, \ldots, x_n, \ldots, x_N$, and then the average delay duration $\bar{x}$ of the target object may be calculated according to a formula as shown in Formula 1.5.

$$\bar{x} = \frac{x_1 + x_2 + \cdots x_n + \cdots + x_N}{N} = \frac{\sum\limits_{n=1}^{N} x_n}{N} \qquad \text{Formula (1.5)}$$

After the average delay duration of the target object is obtained, a delay deviation duration of the target object may be determined according to the average delay duration and the delay durations of the N actual transformation points. In the embodiment of this application, the delay deviation duration 61 of the target object may be calculated according to a formula as shown in Formula 1.6.

$$\sigma_1 = \sqrt{\frac{\sum\limits_{n=1}^{N}(x_n - \bar{x})}{N}} \qquad \text{Formula (1.6)}$$

In some embodiments, the indicator value under the delay indicator may be calculated by using the indicator parameter associated with the delay indicator, the average delay duration, and the delay deviation duration, and the indicator value under the delay indicator may be added to the reference curve deviation information between the reference vibration attribute curve and the actual vibration attribute curve. In the embodiment of this application, the indicator value R under the delay indicator may be calculated according to a formula as shown in Formula 1.7.

$$R = p - p_1 \times \bar{x} - p_2 \times \sigma_1 \qquad \text{Formula (1.7)}$$

Where, p, $p_1$, and $p_2$ are indicator parameters associated with the delay indicator, $\bar{x}$ is the average trailing duration, and $\sigma_1$ is the delay deviation duration. Where, $p_1$ and $p_2$ in the indicator parameters associated with the delay indicator are respectively adjustment parameters of the average delay duration and the delay deviation duration. Researches show that the maximum delay duration generated by the target object in the vibration process is usually 1000 ms. To ensure that the final result of the R value can fall within the interval of 0 to 100, p may be set as 100, and the range of the value R may also be corrected by a difference from 100. The greater the value R, the smaller the delay duration, and the better the vibration effect. However, $p_1$ and $p_2$ may respectively be 0.08 and 0.02, or may also respectively be 0.04 and 0.06, as long as satisfying $p_1 + p_2 = 0.1$, and the values $p_1$ and $p_2$ may be adjusted according to the weighting degrees of the average delay duration and the delay deviation duration.

Figure 6:
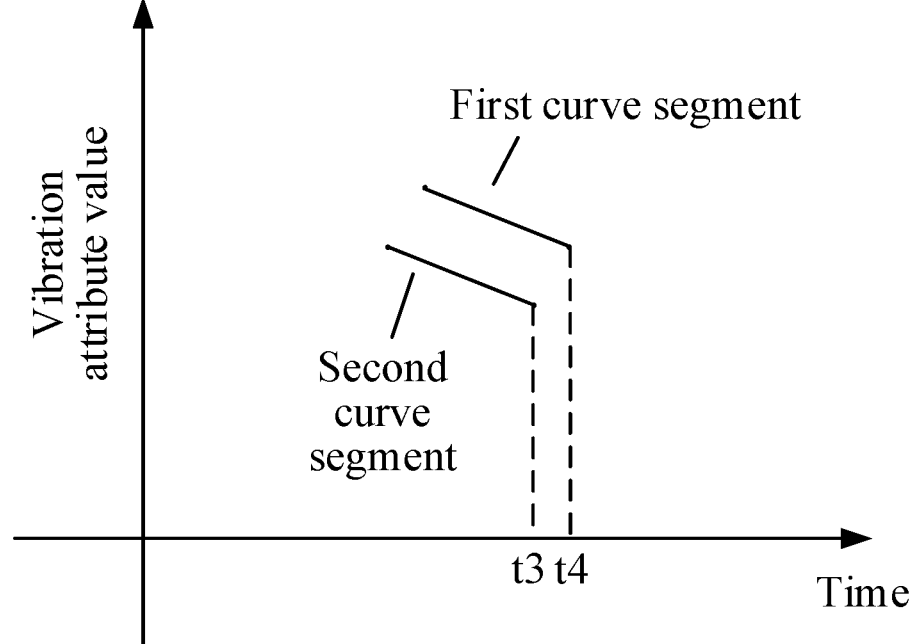
FIG. 6 is a schematic diagram showing a delay duration between a first curve segment and a second curve segment provided by an embodiment of this application.

In one implementation, according to the above description, it can be known that the actual vibration attribute curve may include a plurality of first curve segments, the reference vibration attribute curve may include a plurality of second curve segments, and one first curve segment corresponds to one second curve segment. An implementation manner of acquiring the indicator value under the trailing indicator may include: the computer device may calculate, according to an end timestamp corresponding to each first curve segment and an end timestamp corresponding to the corresponding second curve segment, a trailing duration of each first curve segment. Taking any first curve segment and the corresponding second curve segment as an example, the difference between the end timestamp corresponding to the first curve segment and the end timestamp corresponding to the second curve segment may be taken as the trailing duration of the first curve segment. As shown in FIG. 6, taking the any first curve segment and the corresponding second curve segment as an example for description, t4 is an end timestamp corresponding to the first curve segment, t3 is an end timestamp corresponding to the second curve segment, and the trailing duration of the first curve segment is t4–t3.

After the trailing duration of each first curve segment is obtained, a mean operation may be performed on the trailing duration of each first curve segment to obtain an average trailing duration of the target object. According to the above description, it can be known that the definitions of the N actual transformation points are different, and the numbers of the first curve segments obtained by dividing according to the N actual transformation points are also different. In the embodiment of this application, in order to facilitate description, the N actual transformation points may be defined as including each turning point in the actual vibration attribute curve, and the starting point or the end point in the actual vibration attribute curve. The actual vibration attribute curve may be divided into N first curve segments by the N actual transformation points. If the delay durations of the N first curve segments are respectively $y_1, y_2, \ldots, y_n, \ldots, y_N$, and then the average trailing duration $\bar{y}$ of the target object may be calculated according to a formula as shown in Formula 1.8.

$$\bar{y} = \frac{y_1 + y_2 + \cdots y_n + \cdots + y_N}{N} = \frac{\sum\limits_{n=1}^{N} y_n}{N} \qquad \text{Formula (1.8)}$$

After the average trailing duration of the target object is obtained, a trailing deviation duration of the target object may be determined according to the average trailing duration and the trailing durations of the various first curve segments. In the embodiment of this application, the trailing deviation duration $\sigma_2$ of the target object may be calculated according to a formula as shown in Formula 1.9.

$$\sigma_2 = \sqrt{\frac{\sum\limits_{n=1}^{N}(y_n - \bar{y})^2}{N}} \qquad \text{Formula (1.9)}$$

In some embodiments, the indicator value under the trailing indicator may be calculated by using the indicator parameter associated with the trailing indicator, the average trailing duration, the trailing deviation duration, and the indicator value under the trailing indicator may be added to the reference curve deviation information between the reference vibration attribute curve and the actual vibration attribute curve. In the embodiment of this application, the indicator value S under the trailing indicator may be calculated according to a formula as shown in Formula 2.0.

$$S = q - q_1 \times \bar{y} - q_2 \times \sigma_2 \qquad \text{Formula (2.0)}$$

Where, $q$, $q_1$, and $q_2$ are indicator parameters associated with the trailing indicator, $\hat{y}$ is the average trailing duration, and $\sigma_2$ is the trailing deviation duration. Where, $q_1$ and $q_2$ in the indicator parameters associated with the trailing indicator are respectively adjustment parameters of the average trailing duration and the trailing deviation duration. Values of $q$, $q_1$, and $q_2$ may refer to value rules of $p$, $p_1$, and $p_2$ in the Formula 1.7 used when calculating the indicator value under the delay indicator.

S506: Perform evaluation processing on (including adjust) the vibration effect of the target object based on the target curve deviation information and the reference curve deviation information.

In some embodiments, the computer device may acquire weights of various indicators involved in the target curve deviation information and the reference curve deviation information. The weights of various indicators may be preset according to actual demands in different application scenarios, and the numerical values corresponding to the weights are not limited in this application. After the weights of various indicators are acquired, weighted summation may be performed on various indicator values in the target curve deviation information and the reference curve deviation information by using the acquired weights of various indicators to obtain a vibration effect description value of the target object, and the vibration effect description value is positively correlated with the vibration effect.

In one implementation, the target curve deviation information may include one or more of an indicator value under an intensity deviation indicator and an indicator value under a frequency deviation indicator. The reference curve deviation information may include the indicator value under the delay indicator and the indicator value under the trailing indicator. An example in which the target curve deviation information includes the indicator value under the intensity deviation indicator and the indicator value under the frequency deviation indicator, and the reference curve deviation information includes the indicator value under the delay indicator and the indicator value under the trailing indicator is taken for description below.

The computer device may acquire a weight of the indicator value under the delay indicator, a weight of the indicator value under the trailing indicator, a weight of the indicator value under the frequency deviation indicator, and a weight of the indicator value under the intensity deviation indicator. After the above weights are acquired, weighted summation may be performed on various indicator values by using the various weights above to obtain a vibration effect description value of the target object. In the embodiment of this application, the vibration effect description value of the target object may be obtained by using a second vibration effect function. The second vibration effect function may be as shown in Formula 2.1.

$$F = \left(1 - \frac{1}{1 + e^{(d_1 \times R + d_2 \times S + d_3 \times Fhz + d_4 \times Fin)}}\right) \times 100 \qquad \text{Formula (2.1)}$$

Where, $F \in [1, 100]$, R is the indicator value under the delay indicator, S is the indicator value of the trailing indicator, Fhz is the indicator value under the frequency deviation indicator, and Fin in the indicator value under the intensity deviation indicator. Where, $d_1$, $d_2$, $d_3$, and $d_4$ are respectively the weights corresponding to various indicators, and $d_1$, $d_2$, $d_3$, and $d_4$ may be adjusted according to different application scenarios.

A value may be calculated according to Formula (2.1), and the value is the vibration effect description value of the target object. The vibration effect description value is positively correlated with the vibration effect, that is, the greater the value F, the better the vibration effect of the target object, and correspondingly, the smaller the value F, the poorer the vibration effect of the target object.

For specific implementations of step S501 to step S504, refer to the description of step S201 to S204 in the above embodiments.

In the embodiment of this application, the computer device corrects the actual vibration attribute curve of the target object, which can effectively improve the accuracy and the reliability of the corrected actual vibration curve, so that the corrected actual vibration curve can accurately reflect an actual vibration situation of the target object to a certain extent. Therefore, when the vibration effect of the target object is evaluated according to the curve deviation information between the corrected actual vibration attribute curve and the reference vibration attribute curve, the vibration effect of the target object is comprehensively evaluated in combination with the curve deviation information between the actual attribute curve and the reference vibration attribute curve, an error of the curve deviation information can be effectively reduced, and the accuracy of the curve deviation information can be improved, thereby reducing an evaluation error of the vibration effect of the target object, and improving the accuracy of an evaluation result of the vibration effect of the target object. The vibration evaluation method supports horizontal comparison of vibration effects under different hardware conditions and different software conditions. Meanwhile, under the same software and hardware condition, there is a difference between vibration effects generated by controlling the target object to vibrate through different reference vibration attribute information, the vibration evaluation solution may support accurate evaluation of the vibration effects corresponding to the different reference vibration attribute information, so as to realize a design of reverse guidance for the vibration effects by using accurate evaluation results and maximize an optimal effect of hardware.

Figure 7:
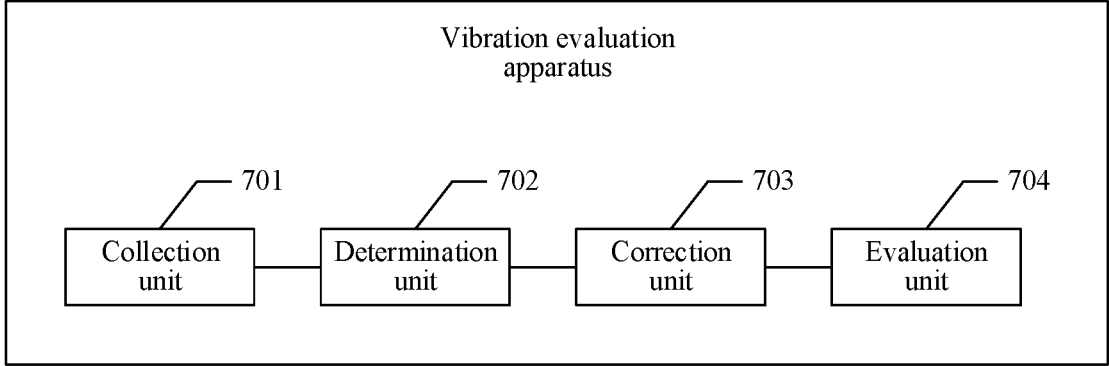
FIG. 7 is a schematic structural diagram of a vibration evaluation apparatus provided by an embodiment of this application.

Based on the description of the above vibration evaluation method embodiments, the embodiment of this application further discloses a vibration evaluation apparatus. The vibration evaluation apparatus may be a computer program (including program code) running in the computer device mentioned above. The vibration evaluation apparatus may implement the method as shown in FIG. 2 or FIG. 5. Referring to FIG. 7, the vibration evaluation apparatus may run the following units:

a collection unit 701, configured to collect, in a process of controlling a target object to vibrate according to reference vibration attribute information, an actual vibration attribute curve of the target object, the reference vibration attribute information including reference vibration attribute values at a plurality of timestamps, and the actual vibration attribute curve being generated according to the collected actual vibration attribute values at the plurality of timestamps; a determination unit 702, configured to determine one or more delay durations of N actual transformation points according to a time difference between a reference vibration attribute curve corresponding to the reference vibration attribute information and the actual vibration attribute curve, the N actual transformation points including: each turning point in the actual vibration attribute curve, N being a positive integer; a correction unit 703, configured to correct the actual vibration attribute curve by using the delay durations of the N actual transformation points to obtain a corrected vibration attribute curve; and an evaluation unit 704, configured to acquire target curve deviation information between the reference vibration attribute curve and the corrected vibration attribute curve, and perform evaluation processing on a vibration effect of the target object based on the target curve deviation information.

In one implementation, the reference vibration attribute curve includes N reference transformation points, and the N reference transformation points include: each turning point in the reference vibration attribute curve, one reference transformation point corresponding to one actual transformation point; and the determination unit 702, when configured to determine the delay durations of the N actual transformation points according to the difference between the reference vibration attribute curve corresponding to the reference vibration attribute information and the actual vibration attribute curve, is further configured to: determine a timestamp of an $n^{th}$ reference transformation point in the reference vibration attribute curve, and determine a timestamp of an $n^{th}$ actual transformation point in the actual vibration attribute curve, $n \in [1, N]$, and determine the delay duration of the $n^{th}$ actual transformation point according to the timestamp of the $n^{th}$ reference transformation point and the timestamp of the $n^{th}$ actual transformation point.

In another implementation, the reference vibration attribute curve includes N reference transformation points; and the correction unit 703, when configured to correct the actual vibration attribute curve by using the delay durations of the N actual transformation points to obtain the corrected vibration attribute curve, is further configured to: perform segmentation processing on the actual vibration attribute curve by using the N actual transformation points to obtain a plurality of first curve segments, any two adjacent first curve segments being connected by using one actual transformation point, perform segmentation processing on the reference vibration attribute curve by using the N reference transformation points to obtain a plurality of second curve segments, any two adjacent second curve segments being connected by using one reference transformation point, determine, according to the delay duration of the actual transformation point corresponding to each first curve segment, a delay duration between the each first curve segment and a corresponding second curve segment, and correct the each first curve segment according to the delay duration between the each first curve segment and the corresponding second curve segment to obtain the corrected vibration attribute curve, the corrected vibration attribute curve including various corrected first curve segments, and each corrected first curve segment being aligned with the corresponding second curve segment.

In another implementation, the correction unit 703, when configured to correct the each first curve segment according to the delay duration between the each first curve segment and the corresponding second curve segment, is further configured to: determine a translation parameter of an $i^{th}$ first curve segment according to the delay duration between the $i^{th}$ first curve segment and the corresponding second curve segment, the translation parameter including a translation direction and a translation length, i being a positive integer, and being less than or equal to the number of the first curve segments; and perform translation processing on the $i^{th}$ first curve segment by using the translation parameter.

In another implementation, the correction unit 703, when configured to correct the each first curve segment according to the delay duration between the each first curve segment and the corresponding second curve segment, is further configured to: calculate a scaling parameter of the $i^{th}$ first curve segment according a duration range corresponding to the $i^{th}$ first curve segment and a duration range corresponding to the corresponding second curve segment; and perform scaling processing on the $i^{th}$ first curve segment by using the scaling parameter, and trigger an operation of performing the translation processing on the $i^{th}$ first curve segment by using the translation parameter.

In another implementation, the correction unit 703, when configured to correct the each first curve segment according to the delay duration between the each first curve segment and the corresponding second curve segment, is further configured to: calculate a scaling parameter of the $i^{th}$ first curve segment according a duration range corresponding to the $i^{th}$ first curve segment and a duration range corresponding to the corresponding second curve segment; and perform the scaling processing on the $i^{th}$ first curve segment after the translation processing by using the scaling parameter.

In another implementation, the reference vibration attribute value includes: a reference vibration intensity value in a vibration intensity dimension, then each of the reference vibration attribute curve, the actual vibration attribute curve, and the corrected vibration attribute curve includes a vibration curve in the vibration intensity dimension, and the target curve deviation information includes an indicator value under an intensity deviation indicator; and when the reference vibration attribute value includes: a reference vibration frequency value in a vibration frequency dimension, then each of the reference vibration attribute curve, the actual vibration attribute curve, and the corrected vibration attribute curve includes a vibration curve in the vibration frequency dimension, and the target curve deviation information includes an indicator value under a frequency deviation indicator.

In another implementation, for any deviation indicator, the any deviation indicator may be the intensity deviation indicator or the frequency deviation indicator; the evaluation unit 704, when configured to calculate the indicator value under the any deviation indicator, is further configured to: determine an attribute value threshold supported by the target object in a target dimension, the target dimension being the vibration intensity dimension when the any deviation indicator is the intensity deviation indicator, and the target dimension being the vibration frequency dimension when the any deviation indicator is the frequency deviation indicator; determine the vibration curve, in the target dimension, of the reference vibration attribute curve as a target reference curve; determine the vibration curve, in the target dimension, of the corrected vibration attribute curve as a target corrected curve; calculate an attribute deviation value in the target dimension according to the attribute value threshold, each target reference vibration attribute value indicated by the target reference curve, and a target corrected vibration attribute value indicated by the target corrected curve; and calculate, according to the attribute deviation value in the target dimension, the indicator value under the target deviation indicator by using a deviation function under the target deviation indicator corresponding to the target dimension.

In another implementation, the evaluation unit 704, when configured to calculate an attribute deviation value in the target dimension according to the attribute value threshold, each target reference vibration attribute value indicated by the target reference curve, and each target corrected vibration attribute value indicated by the target corrected curve, is further configured to: divide the target reference curve into M third curve segments and divide the target corrected curve into M fourth curve segments according to a preset duration, M being a positive integer, and one third curve segment corresponding to one fourth curve segment; respectively calculate a curve segment deviation value corresponding to each third curve segment according to the attribute value threshold, each target reference vibration attribute value indicated by each third curve segment, and each target corrected vibration attribute value indicated by the corresponding fourth curve segment; and perform a mean operation on the curve segment deviation value corresponding to each third curve segment to obtain the attribute deviation value in the target dimension.

In another implementation, the evaluation unit 704, when configured to calculate the curve segment deviation value corresponding to the $m^{th}$ third curve segment, is further configured to: calculate a ratio of each target reference vibration attribute value indicated by the $m^{th}$ third curve segment to the attribute value threshold to obtain a first relative vibration attribute value of the target object at each target timestamp; calculate a ratio of each target corrected vibration attribute value indicated by the $m^{th}$ fourth curve segment to the attribute value threshold to obtain a second relative vibration attribute value of the target object at each target timestamp; and calculate the curve segment deviation value corresponding to the $m^{th}$ third curve segment according to a time difference between the first relative vibration attribute value at each target timestamp and the corresponding second relative vibration attribute value, $m \in [1, M]$, the target timestamp referring to: a timestamp corresponding to the target reference vibration attribute value.

In another implementation, the evaluation unit 704, when configured to perform the evaluation processing on the vibration effect of the target object based on the target curve deviation information, is further configured to: acquire reference curve deviation information between the reference vibration attribute curve and the actual vibration attribute curve; and perform evaluation processing on the vibration effect of the target object based on the target curve deviation information and the reference curve deviation information.

In another implementation, the actual vibration attribute curve includes a plurality of first curve segments, the reference vibration attribute curve includes a plurality of second curve segments, and one first curve segment corresponds to one second curve segment; and the evaluation unit 704, when configured to acquire the reference curve deviation information between the reference vibration attribute curve and the actual vibration attribute curve, is further configured to: calculate, according to an end timestamp corresponding to each first curve segment and an end timestamp corresponding to the corresponding second curve segment, a trailing duration of each first curve segment;

perform a mean operation on the trailing duration of each first curve segment to obtain an average trailing duration of the target object; determine a trailing deviation duration of the target object according to the average trailing duration and the N trailing durations of various first curve segments; calculate an indicator value under a trailing indicator by using an indicator parameter associated with the trailing indicator, the average trailing duration, and the trailing deviation duration; and add the indicator value under the trailing indicator to the reference curve deviation information between the reference vibration attribute curve and the actual vibration attribute curve.

In another implementation, the evaluation unit 704, when configured to acquire the reference curve deviation information between the reference vibration attribute curve and the actual vibration attribute curve, is further configured to: perform a mean operation on delay durations of the N actual transformation points to obtain an average delay duration of the target object; determine a delay deviation duration of the target object according to the average delay duration and the delay durations of the N actual transformation points; calculate an indicator value under the delay indicator by using an indicator parameter associated with the delay indicator, the average trailing duration, and the delay deviation duration; and add the indicator value under the delay indicator to the reference curve deviation information between the reference vibration attribute curve and the actual vibration attribute curve.

In another implementation, the evaluation unit 704, when configured to perform the evaluation processing on the vibration effect of the target object based on the target curve deviation information and the reference curve deviation information, is further configured to: acquire weights of various indicators involved in the target curve deviation information and the reference curve deviation information; and perform weighted summation on various indicator values in the target curve deviation information and the reference curve deviation information by using the acquired weights of various indicators to obtain a vibration effect description value of the target object, the vibration effect description value being positively correlated with the vibration effect.

According to one embodiment of this application, various steps involved in the method shown in FIG. 2 or FIG. 5 may be performed by various units in the vibration evaluation apparatus shown in FIG. 7. For example, step S201 shown in FIG. 2 is performed by the collection unit 701 shown in FIG. 7, step S202 is performed by the determination unit 702 shown in FIG. 7, step S203 is performed by the correction unit 703 shown in FIG. 7, and step S204 is performed by the evaluation unit 704 shown in FIG. 7. For example, step S501 shown in FIG. 5 is performed by the collection unit 701 shown in FIG. 7, step S502 is performed by the determination unit 702 shown in FIG. 7, step S503 is performed by the correction unit 703 shown in FIG. 7, and steps S504 to step S506 are performed by the evaluation unit 704 shown in FIG. 7.

According to another embodiment of this application, various in the vibration evaluation apparatus shown in FIG. 7 may be separately or wholly combined into one or several other units, or one (or more) of the units therein may further be divided into a plurality of functionally smaller units. In this way, same operations can be implemented without affecting the achievement of the technical effects of the embodiment of this application. The above units are divided based on logical functions. In an actual application, a function of one unit may also be implemented by a plurality of units, or functions of a plurality of units are implemented by one unit. In other embodiments of this application, the vibration evaluation apparatus may also include other units. During a practical application, these functions may also be cooperatively implemented by other units, or may be cooperatively implemented by a plurality of units. In this application, the term "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit can be implemented using one or more processors (or processors and memory). Likewise, a processor (or processors and memory) can be used to implement one or more units. Moreover, each unit can be part of an overall unit that includes the functionalities of the unit.

According to another embodiment of this application, the vibration evaluation apparatus as shown in FIG. 7 may be constructed and the vibration evaluation method of the embodiment of this application may be implemented by running a computer program (including program codes) capable of executing various steps involved in the corresponding method shown in FIG. 2 or FIG. 5 on a universal computer device, for example, a computer, that includes processing elements and storage media such as a central processing unit (CPU), a random access storage media (RAM), and a read only storage media (ROM). The computer program may be recorded in, for example, a computer-readable recording medium, and may be loaded in the foregoing computing device by using the computer readable recording medium, and run in the computing device.

In the embodiment of this application, the computer device may collecting, in a process of controlling a target object to vibrate according to reference vibration attribute information, an actual vibration attribute curve of the target object. The reference vibration attribute information includes reference vibration attribute values at a plurality of timestamps, and the actual vibration attribute curve is generated according to the collected actual vibration attribute values at the plurality of timestamps. Then, one or more delay durations of N actual transformation points are determined according to a time difference between a reference vibration attribute curve corresponding to the reference vibration attribute information and the actual vibration attribute curve, and the actual vibration attribute curve is corrected by using the delay durations of the N actual transformation points to obtain the corrected vibration attribute curve. In some embodiments, the target curve deviation information between the reference vibration attribute curve and the corrected vibration attribute curve may be acquired, and evaluation processing may be performed on a vibration effect of the target object based on the target curve deviation information. In the above vibration evaluation process, the actual vibration attribute curve of the target object is corrected, which can effectively improve the accuracy and the reliability of the corrected vibration curve, so that the corrected actual vibration curve can accurately reflect an actual vibration situation of the target object to a certain extent. Therefore, when the vibration effect of the target object is evaluated according to the curve deviation information between the corrected vibration attribute curve and the reference vibration attribute curve, an error of the curve deviation information can be effectively reduced, and the accuracy of the curve deviation information can be improved, thereby reducing an evaluation error of the vibration effect of the target object, and improving the accuracy of an evaluation result of the vibration effect of the target object.

Figure 8:
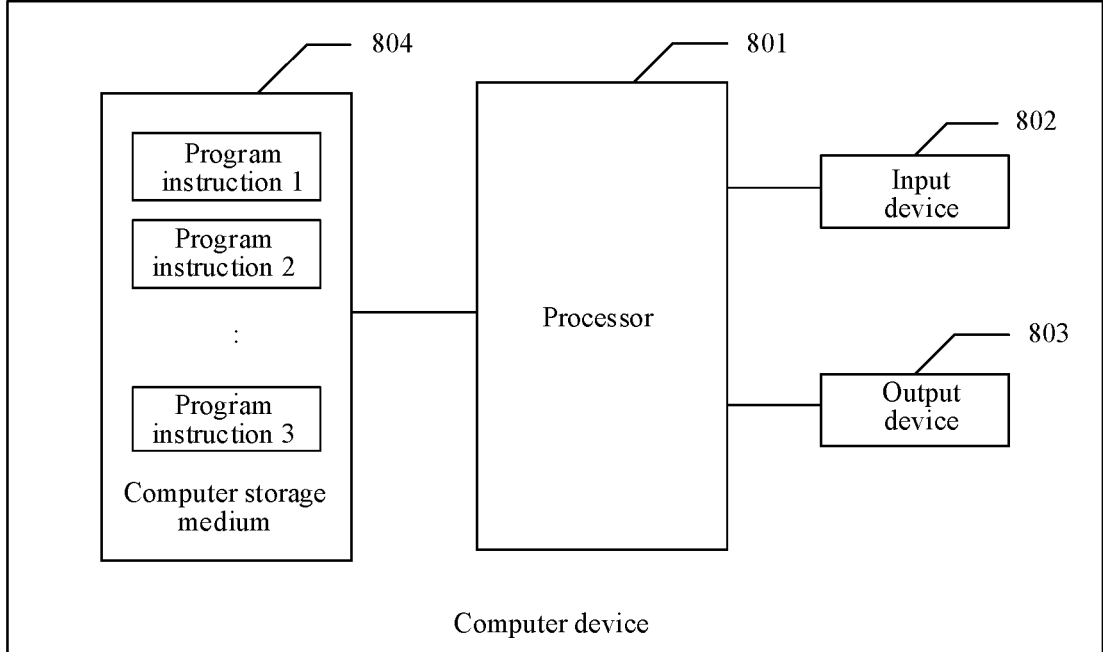
FIG. 8 is a schematic structural diagram of a computer device provided by an embodiment of this application.

Based on the description of the above vibration evaluation method embodiments, the embodiment of this application further discloses a computer device. Referring to FIG. 8, the computer device may at least include a processor 801, an input device 802, an output device 803, and a computer storage medium 804. The processor 801, the input device 802, the output device 803, and the computer storage medium 804 in the computer device may be connected through a bus or in other manners.

The computer storage medium 804 is a memory device in the computer device, and is used for storing programs and data. It is to be understood that the computer storage medium 804 herein may include an internal storage medium of the computer device, and of course, may also include an extended storage medium supported by the computer device. The computer storage medium 804 provides storage space, and the storage space stores an operating system of the computer device. In addition, the storage space further stores one or more computer instructions that are suitable to be loaded and executed by the processor 801. These computer instructions may be one or than one computer programs (including program code). The computer storage medium herein may be a high speed RAM memory, or may be at least one computer storage medium far away from the foregoing processor, the processor may be referred to as a CPU, which is a core and a control center of the computer device, and is suitable for implementing one or more instructions, and loading and executing one or more computer instructions to implement corresponding method processes or functions.

In a feasible embodiment, one or more first instructions stored in the computer storage medium may be loaded and executed by the processor 801 to implement corresponding steps of the methods related to the vibration evaluation method embodiments. During implementation, the one or more first instructions stored in the computer storage medium may be loaded and executed by the processor 801 to perform the following operations:

collecting, in a process of controlling a target object to vibrate according to reference vibration attribute information, an actual vibration attribute curve of the target object, the reference vibration attribute information including reference vibration attribute values at a plurality of timestamps, and the actual vibration attribute curve being generated according to the collected actual vibration attribute values at the plurality of timestamps; determining one or more delay durations of N actual transformation points according to a time difference between a reference vibration attribute curve corresponding to the reference vibration attribute information and the actual vibration attribute curve, the N actual transformation points including: each turning point in the actual vibration attribute curve, N being a positive integer; correcting the actual vibration attribute curve by using the delay durations of the N actual transformation points to obtain a corrected vibration attribute curve; and acquiring target curve deviation information between the reference vibration attribute curve and the corrected vibration attribute curve, and performing evaluation processing on (including adjusting) a vibration effect of the target object based on the target curve deviation information.

In one implementation, the reference vibration attribute curve includes N reference transformation points, and the N reference transformation points include: each turning point in the reference vibration attribute curve, one reference transformation point corresponding to one actual transformation point; and when determining the delay durations of the N actual transformation points according to the difference between the reference vibration attribute curve corresponding to the reference vibration attribute information and the actual vibration attribute curve, the one or more instructions are loaded by the processor 801 to execute: determine a timestamp of an $n^{th}$ reference transformation point in the reference vibration attribute curve, and determine a timestamp of an $n^{th}$ actual transformation point in the actual vibration attribute curve, $n \in [1, N]$, and determining the delay duration of the $n^{th}$ actual transformation point according to the timestamp of the $n^{th}$ reference transformation point and the timestamp of the $n^{th}$ actual transformation point.

In another implementation, the reference vibration attribute curve includes N reference transformation points; and when correcting the actual vibration attribute curve by using the delay durations of the N actual transformation points to obtain a corrected vibration attribute curve, the one or more instructions are loaded by the processor 801 to execute: performing segmentation processing on the actual vibration attribute curve by using the N actual transformation points to obtain a plurality of first curve segments, any two adjacent first curve segments being connected by using one actual transformation point, performing segmentation processing on the reference vibration attribute curve by using the N reference transformation points to obtain a plurality of second curve segments, any two adjacent second curve segments being connected by using one reference transformation point, determining, according to the delay duration of the actual transformation point corresponding to each first curve segment, a delay duration between the each first curve segment and a corresponding second curve segment, and correcting the each first curve segment according to the delay duration between the each first curve segment and the corresponding second curve segment to obtain the corrected vibration attribute curve, the corrected vibration attribute curve including various corrected first curve segments, and each corrected first curve segment being aligned with the corresponding second curve segment.

In another implementation, when correcting the each first curve segment according to the delay duration between the each first curve segment and the corresponding second curve segment, the one or more instructions are loaded by the processor 801 to execute: determining a translation parameter of an $i^{th}$ first curve segment according to the delay duration between the $i^{th}$ first curve segment and the corresponding second curve segment, the translation parameter including a translation direction and a translation length, i being a positive integer, and being less than or equal to the number of the first curve segments; and performing translation processing on the $i^{th}$ first curve segment by using the translation parameter.

In another implementation, when correcting the each first curve segment according to the delay duration between the each first curve segment and the corresponding second curve segment, the one or more instructions are loaded by the processor 801 to execute: calculating a scaling parameter of the $i^{th}$ first curve segment according a duration range corresponding to the $i^{th}$ first curve segment and a duration range corresponding to the corresponding second curve segment; and performing scaling processing on the $i^{th}$ first curve segment by using the scaling parameter, and triggering an operation of performing the translation processing on the $i^{th}$ first curve segment by using the translation parameter.

In another implementation, when correcting the each first curve segment according to the delay duration between the each first curve segment and the corresponding second curve segment, the one or more instructions are loaded by the processor 801 to execute: calculating a scaling parameter of the $i^{th}$ first curve segment according a duration range corresponding to the $i^{th}$ first curve segment and a duration range corresponding to the corresponding second curve segment; and performing the scaling processing on the $i^{th}$ first curve segment after the translation processing by using the scaling parameter.

In another implementation, the reference vibration attribute value includes: a reference vibration intensity value in a vibration intensity dimension, then each of the reference vibration attribute curve, the actual vibration attribute curve, and the corrected vibration attribute curve includes a vibration curve in the vibration intensity dimension, and the target curve deviation information includes an indicator value under an intensity deviation indicator; and when the reference vibration attribute value includes: a reference vibration frequency value in a vibration frequency dimension, then each of the reference vibration attribute curve, the actual vibration attribute curve, and the corrected vibration attribute curve includes a vibration curve in the vibration frequency dimension, and the target curve deviation information includes an indicator value under a frequency deviation indicator.

In another implementation, for any deviation indicator, the any deviation indicator may be the intensity deviation indicator or the frequency deviation indicator; when calculating the indicator value under the any deviation indicator, the one or more instructions are loaded by the processor 801 to execute: determining an attribute value threshold supported by the target object in a target dimension, the target dimension being the vibration intensity dimension when the any deviation indicator is the intensity deviation indicator, and the target dimension being the vibration frequency dimension when the any deviation indicator is the frequency deviation indicator; determining the vibration curve, in the target dimension, of the reference vibration attribute curve as a target reference curve; determining the vibration curve, in the target dimension, of the corrected vibration attribute curve as a target corrected curve; calculating an attribute deviation value in the target dimension according to the attribute value threshold, each target reference vibration attribute value indicated by the target reference curve, and a target corrected vibration attribute value indicated by the target corrected curve; and calculating, according to the attribute deviation value in the target dimension, the indicator value under the target deviation indicator by using a deviation function under the target deviation indicator corresponding to the target dimension.

In another implementation, when calculating an attribute deviation value in the target dimension according to the attribute value threshold, each target reference vibration attribute value indicated by the target reference curve, and each target corrected vibration attribute value indicated by the target corrected curve, the one or more instructions are loaded by the processor 801 to execute: dividing the target reference curve into M third curve segments and dividing the target corrected curve into M fourth curve segments according to a preset duration, M being a positive integer, and one third curve segment corresponding to one fourth curve segment; respectively calculating a curve segment deviation value corresponding to each third curve segment according to the attribute value threshold, each target reference vibration attribute value indicated by each third curve segment, and each target corrected vibration attribute value indicated by the corresponding fourth curve segment; and performing a mean operation on the curve segment deviation value corresponding to each third curve segment to obtain the attribute deviation value in the target dimension.

In another implementation, when calculating the curve segment deviation value corresponding to the $m^{th}$ third curve segment, the one or more instructions are loaded by the processor 801 to execute: calculating a ratio of each target reference vibration attribute value indicated by the $m^{th}$ third curve segment to the attribute value threshold to obtain a first relative vibration attribute value of the target object at each target timestamp; calculating a ratio of each target corrected vibration attribute value indicated by the $m^{th}$ fourth curve segment to the attribute value threshold to obtain a second relative vibration attribute value of the target object at each target timestamp; and calculating the curve segment deviation value corresponding to the $m^{th}$ third curve segment according to a time difference between the first relative vibration attribute value at each target timestamp and the corresponding second relative vibration attribute value, $m \in [1, M]$, and the target timestamp referring to: a timestamp corresponding to the target reference vibration attribute value.

In another implementation, when performing the evaluation processing on the vibration effect of the target object based on the target curve deviation information, the one or more instructions are loaded by the processor 801 to execute: acquiring reference curve deviation information between the reference vibration attribute curve and the actual vibration attribute curve; and performing evaluation processing on (including adjusting) the vibration effect of the target object based on the target curve deviation information and the reference curve deviation information.

In another implementation, the actual vibration attribute curve includes a plurality of first curve segments, the reference vibration attribute curve includes a plurality of second curve segments, and one first curve segment corresponds to one second curve segment; and when acquiring the reference curve deviation information between the reference vibration attribute curve and the actual vibration attribute curve, the one or more instructions are loaded by the processor 801 to execute: calculating, according to an end timestamp corresponding to each first curve segment and an end timestamp corresponding to the corresponding second curve segment, a trailing duration of each first curve segment; performing a mean operation on the trailing duration of each first curve segment to obtain an average trailing duration of the target object; determining a trailing deviation duration of the target object according to the average trailing duration and the N trailing durations of various first curve segments; calculating an indicator value under a trailing indicator by using an indicator parameter associated with the trailing indicator, the average trailing duration, and the trailing deviation duration; and adding the indicator value under the trailing indicator to the reference curve deviation information between the reference vibration attribute curve and the actual vibration attribute curve.

In another implementation, when acquiring the reference curve deviation information between the reference vibration attribute curve and the actual vibration attribute curve, the one or more instructions are loaded by the processor 801 to execute: performing a mean operation on delay durations of the N actual transformation points to obtain an average delay duration of the target object; determining a delay deviation duration of the target object according to the average delay duration and the delay durations of the N actual transformation points; calculating an indicator value under the delay indicator by using an indicator parameter associated with the delay indicator, the average trailing duration, and the delay deviation duration; and adding the indicator value under the delay indicator to the reference curve deviation information between the reference vibration attribute curve and the actual vibration attribute curve.

In another implementation, when performing the evaluation processing on the vibration effect of the target object based on the target curve deviation information and the reference curve deviation information, the one or more instructions are loaded by the processor 801 to execute: acquiring weights of various indicators involved in the target curve deviation information and the reference curve deviation information; and performing weighted summation on various indicator values in the target curve deviation information and the reference curve deviation information by using the acquired weights of various indicators to obtain a vibration effect description value of the target object, the vibration effect description value being positively correlated with the vibration effect.

In the embodiment of this application, the computer device may collecting, in a process of controlling a target object to vibrate according to reference vibration attribute information, an actual vibration attribute curve of the target object. The reference vibration attribute information includes reference vibration attribute values at a plurality of timestamps, and the actual vibration attribute curve is generated according to the collected actual vibration attribute values at the plurality of timestamps. Then, one or more delay durations of N actual transformation points are determined according to a time difference between a reference vibration attribute curve corresponding to the reference vibration attribute information and the actual vibration attribute curve, and the actual vibration attribute curve is corrected by using the delay durations of the N actual transformation points to obtain the corrected vibration attribute curve. In some embodiments, the target curve deviation information between the reference vibration attribute curve and the corrected vibration attribute curve may be acquired, and evaluation processing may be performed on a vibration effect of the target object based on the target curve deviation information. In the above vibration evaluation process, the actual vibration attribute curve of the target object is corrected, which can effectively improve the accuracy and the reliability of the corrected actual vibration curve, so that the corrected actual vibration curve can accurately reflect an actual vibration situation of the target object to a certain extent. Therefore, when the vibration effect of the target object is evaluated according to the curve deviation information between the corrected actual vibration attribute curve and the reference vibration attribute curve, an error of the curve deviation information can be effectively reduced, and the accuracy of the curve deviation information can be improved, thereby reducing an evaluation error of the vibration effect of the target object, and improving the accuracy of an evaluation result of the vibration effect of the target object.

An embodiment of this application further provides a computer program product or a computer program. The computer program product or the computer program includes computer instructions. The computer instructions are stored in a computer-readable storage medium. A processor of a computer device reads the computer instructions from the computer-readable storage medium, and the processor executes the computer instructions to enable the computer device to perform the steps performed in the FIG. 2 or FIG. 5 of the above vibration evaluation method embodiments.

A person of ordinary skill in the art may understand that all or some of the procedures of the methods of the above embodiments may be implemented by a computer program instructing relevant hardware. The program may be stored in a computer-readable storage medium. When the program is executed, the procedures of the foregoing method embodiments may be implemented. The storage medium may include a magnetic disc, an optical disc, a read-only memory (ROM), a RAM, or the like.

What is disclosed above is merely an exemplary embodiment of this application, and is certainly not intended to limit the protection scope of this application. A person of ordinary skill in the art may understand that all or some of processes that implement the above embodiments and equivalent modifications made in accordance with this application still fall within the scope of this application.

What is claimed is:

1. A vibration evaluation method, comprising:

generating, in a process of controlling a target object to vibrate according to a reference vibration attribute curve, an actual vibration attribute curve of the target object, the reference vibration attribute curve including reference vibration attribute values at a plurality of timestamps;

determining at least one delay duration of N actual transformation points according to a time difference between the reference vibration attribute curve and the actual vibration attribute curve, N being a positive integer;

correcting the actual vibration attribute curve by using the at least one delay duration of the N actual transformation points to obtain a corrected vibration attribute curve;

acquiring target curve deviation information between the reference vibration attribute curve and the corrected vibration attribute curve; and adjusting a vibration effect of the target object based on the target curve deviation information.

2. The method according to claim 1, wherein the reference vibration attribute curve comprises N reference transformation points, each reference transformation point corresponding to a respective one actual transformation point; the determining at least one delay duration of N actual transformation points according to a time difference between the reference vibration attribute curve and the actual vibration attribute curve comprises:

determining a timestamp of an $n^{th}$ reference transformation point in the reference vibration attribute curve, and a timestamp of an $n^{th}$ actual transformation point in the actual vibration attribute curve, $n \in [1, N]$; and determining the delay duration of the nth actual transformation point according to the timestamp of the nth reference transformation point and the timestamp of the nth actual transformation point.

3. The method according to claim 2, further comprising:

setting a time difference between the timestamp of the $1^{th}$ reference transformation point in the reference vibration attribute curve and the corresponding $1^{st}$ actual transformation point in the actual vibration attribute curve to be a delay duration between the reference vibration attribute curve and the actual vibration attribute curve.

4. The method according to claim 1, wherein the reference vibration attribute curve comprises N reference transformation points; and the correcting the actual vibration attribute curve by using the delay duration of the N actual transformation points to obtain a corrected vibration attribute curve comprises:

performing segmentation processing on the actual vibration attribute curve by using the N actual transformation points to obtain a plurality of first curve segments, any two adjacent first curve segments being connected by using one actual transformation point; and performing segmentation processing on the reference vibration attribute curve by using the N reference transformation points to obtain a plurality of second curve segments, any two adjacent second curve segments being connected by using one reference transformation point.

5. The method according to claim 4, further comprising:

determining, according to the delay duration of the $n^{th}$ actual transformation point corresponding to each first curve segment, a delay duration between each first curve segment and a corresponding second curve segment, correcting the each first curve segment according to the delay duration between the each first curve segment and the corresponding second curve segment to obtain the corrected vibration attribute curve, and the corrected vibration attribute curve comprising one or more corrected first curve segments, and each corrected first curve segment being aligned with the corresponding second curve segment.

6. The method according to claim 5, wherein the correcting the each first curve segment according to the delay duration between the each first curve segment and the corresponding second curve segment comprises:

determining a translation parameter of an $i^{th}$ first curve segment according to the delay duration between the $i^{th}$ first curve segment and the corresponding second curve segment, the translation parameter comprising a translation direction and a translation length, i being a positive integer, and i being less than or equal to the number of the first curve segments; and performing translation processing on the $i^{th}$ first curve segment by using the translation parameter.

7. The method according to claim 6, wherein the correcting the each first curve segment according to the delay duration between the each first curve segment and the corresponding second curve segment further comprises:

determining a scaling parameter of the $i^{th}$ first curve segment according to a duration range corresponding to the $i^{th}$ first curve segment and a duration range corresponding to the corresponding second curve segment; and performing scaling processing on the $i^{th}$ first curve segment by using the scaling parameter, and triggering an operation of performing the translation processing on the $i^{th}$ first curve segment by using the translation parameter.

8. The method according to claim 6, wherein the correcting the each first curve segment according to the delay duration between the each first curve segment and the corresponding second curve segment further comprises:

determining a scaling parameter of the $i^{th}$ first curve segment according to a duration range corresponding to the $i^{th}$ first curve segment and a duration range corresponding to the corresponding second curve segment; and performing the scaling processing on the $i^{th}$ first curve segment after the translation processing by using the scaling parameter.

9. The method according to claim 1, wherein when the reference vibration attribute value comprises: a reference vibration intensity value in a vibration intensity dimension, then each of the reference vibration attribute curve, the actual vibration attribute curve, and the corrected vibration attribute curve comprises a vibration curve in the vibration intensity dimension, and the target curve deviation information comprises an indicator value under an intensity deviation indicator; and when the reference vibration attribute value comprises: a reference vibration frequency value in a vibration frequency dimension, then each of the reference vibration attribute curve, the actual vibration attribute curve, and the corrected vibration attribute curve comprises a vibration curve in the vibration frequency dimension, and the target curve deviation information comprises an indicator value under a frequency deviation indicator.

10. The method according to claim 1, wherein the adjusting a vibration effect of the target object based on the target curve deviation information comprises:

acquiring reference curve deviation information between the reference vibration attribute curve and the actual vibration attribute curve; and adjusting the vibration effect of the target object based on the target curve deviation information and the reference curve deviation information.

11. The method according to claim 10, wherein the actual vibration attribute curve comprises a plurality of first curve segments, the reference vibration attribute curve comprises a plurality of second curve segments, and one first curve segment corresponds to one second curve segment; the acquiring reference curve deviation information between the reference vibration attribute curve and the actual vibration attribute curve comprises:

calculating, according to an end timestamp corresponding to each first curve segment and an end timestamp corresponding to the corresponding second curve segment, a trailing duration of each first curve segment;

performing a mean operation on the trailing duration of each first curve segment to obtain an average trailing duration of the target object; determining a trailing deviation duration of the target object according to the average trailing duration and the N trailing durations of various first curve segments;

calculating an indicator value under a trailing indicator by using an indicator parameter associated with the trailing indicator, the average trailing duration, and the trailing deviation duration; and adding the indicator value under the trailing indicator to the reference curve deviation information between the reference vibration attribute curve and the actual vibration attribute curve.

12. The method according to claim 10, wherein the acquiring reference curve deviation information between the reference vibration attribute curve and the actual vibration attribute curve comprises:

performing a mean operation on delay durations of the N actual transformation points to obtain an average delay duration of the target object;

determining a delay deviation duration of the target object according to the average delay duration and the delay durations of the N actual transformation points;

calculating an indicator value under the delay indicator by using an indicator parameter associated with the delay indicator, the average trailing duration, and the delay deviation duration; and adding the indicator value under the delay indicator to the reference curve deviation information between the reference vibration attribute curve and the actual vibration attribute curve.

13. A computer device, comprising: a processor, a computer storage medium and one or more instructions stored in the computer storage medium that, when executed by the processor, cause the computer device to perform a vibration evaluation method including:

generating, in a process of controlling a target object to vibrate according to a reference vibration attribute curve, an actual vibration attribute curve of the target object, the reference vibration attribute curve including reference vibration attribute values at a plurality of timestamps;

determining at least one delay duration of N actual transformation points according to a time difference between the reference vibration attribute curve and the actual vibration attribute curve, N being a positive integer;

correcting the actual vibration attribute curve by using the at least one delay duration of the N actual transformation points to obtain a corrected vibration attribute curve;

acquiring target curve deviation information between the reference vibration attribute curve and the corrected vibration attribute curve; and adjusting a vibration effect of the target object based on the target curve deviation information.

14. The computer device according to claim 13, wherein the reference vibration attribute curve comprises N reference transformation points, each reference transformation point corresponding to a respective one actual transformation point; the determining at least one delay duration of N actual transformation points according to a time difference between the reference vibration attribute curve and the actual vibration attribute curve comprises:

determining a timestamp of an $n^{th}$ reference transformation point in the reference vibration attribute curve, and a timestamp of an $n^{th}$ actual transformation point in the actual vibration attribute curve, $n \in [1, N]$; and determining the delay duration of the $n^{th}$ actual transformation point according to the timestamp of the $n^{th}$ reference transformation point and the timestamp of the $n^{th}$ actual transformation point.

15. The computer device according to claim 14, wherein the method further comprises:

setting a time difference between the timestamp of the $1^{th}$ reference transformation point in the reference vibration attribute curve and the corresponding $1^{st}$ actual transformation point in the actual vibration attribute curve to be a delay duration between the reference vibration attribute curve and the actual vibration attribute curve.

16. The computer device according to claim 13, wherein the reference vibration attribute curve comprises N reference transformation points; and the correcting the actual vibration attribute curve by using the delay durations of the N actual transformation points to obtain a corrected vibration attribute curve comprises:

performing segmentation processing on the actual vibration attribute curve by using the N actual transformation points to obtain a plurality of first curve segments, any two adjacent first curve segments being connected by using one actual transformation point; and performing segmentation processing on the reference vibration attribute curve by using the N reference transformation points to obtain a plurality of second curve segments, any two adjacent second curve segments being connected by using one reference transformation point.

17. The computer device according to claim 16, wherein the method further comprises:

determining, according to the delay duration of the $n^{th}$ actual transformation point corresponding to each first curve segment, a delay duration between each first curve segment and a corresponding second curve segment, correcting the each first curve segment according to the delay duration between each first curve segment and the corresponding second curve segment to obtain the corrected vibration attribute curve, and the corrected vibration attribute curve comprising various corrected first curve segments, and each corrected first curve segment being aligned with the corresponding second curve segment.

18. The computer device according to claim 13, wherein when the reference vibration attribute value comprises: a reference vibration intensity value in a vibration intensity dimension, then each of the reference vibration attribute curve, the actual vibration attribute curve, and the corrected vibration attribute curve comprises a vibration curve in the vibration intensity dimension, and the target curve deviation information comprises an indicator value under an intensity deviation indicator; and when the reference vibration attribute value comprises: a reference vibration frequency value in a vibration frequency dimension, then each of the reference vibration attribute curve, the actual vibration attribute curve, and the corrected vibration attribute curve comprises a vibration curve in the vibration frequency dimension, and the target curve deviation information comprises an indicator value under a frequency deviation indicator.

19. The computer device according to claim 13, wherein the adjusting a vibration effect of the target object based on the target curve deviation information comprises:

acquiring reference curve deviation information between the reference vibration attribute curve and the actual vibration attribute curve; and adjusting the vibration effect of the target object based on the target curve deviation information and the reference curve deviation information.

20. A non-transitory computer storage medium, storing one or more instructions that, when executed by a processor of a computer device, cause the computer device to perform a vibration evaluation method including:

generating, in a process of controlling a target object to vibrate according to a reference vibration attribute curve, an actual vibration attribute curve of the target object, the reference vibration attribute curve including reference vibration attribute values at a plurality of timestamps;

determining at least one delay duration of N actual transformation points according to a time difference between the reference vibration attribute curve and the actual vibration attribute curve, N being a positive integer;

correcting the actual vibration attribute curve by using the at least one delay duration of the N actual transformation points to obtain a corrected vibration attribute curve;

acquiring target curve deviation information between the reference vibration attribute curve and the corrected vibration attribute curve; and adjusting a vibration effect of the target object based on the target curve deviation information.

\* \* \* \* \*